United States Patent
Raj et al.

(10) Patent No.: US 12,248,304 B2
(45) Date of Patent: Mar. 11, 2025

(54) FUNCTIONAL SAFETY WITH ROOT OF SAFETY AND CHAIN OF SAFETY

(71) Applicant: Intel Corporation, Santa Clara, CA (US)

(72) Inventors: Darshan Raj, Karlsruhe (DE); Ralf Sengle, Pfinztal (DE)

(73) Assignee: INTEL CORPORATION, Santa Clara, CA (US)

( * ) Notice: Subject to any disclaimer, the term of this patent is extended or adjusted under 35 U.S.C. 154(b) by 836 days.

(21) Appl. No.: 17/213,920

(22) Filed: Mar. 26, 2021

(65) Prior Publication Data

US 2021/0247743 A1    Aug. 12, 2021

(51) Int. Cl.
*G05B 19/418* (2006.01)

(52) U.S. Cl.
CPC ..... *G05B 19/4184* (2013.01); *G05B 19/4183* (2013.01); *G05B 19/41865* (2013.01)

(58) Field of Classification Search
CPC ............ G05B 19/4184; G05B 19/4183; G05B 19/41865; G05B 2219/2637; G05B 19/4063; G05B 23/0291; G05B 9/02; G05B 19/0428; G05B 23/0213; G05B 2219/24065; B60L 3/0092; G06F 11/0706; G06F 11/0796; G06F 11/3013; G06F 11/3055; G06F 11/3058; G06F 11/3089; G06F 11/3466; B25J 9/1674
See application file for complete search history.

(56) References Cited

U.S. PATENT DOCUMENTS

| | | | |
|---|---|---|---|
| 2019/0235448 A1* | 8/2019 | Banginwar | H04L 12/40 |
| 2019/0258251 A1* | 8/2019 | Ditty | G06V 20/58 |
| 2020/0272123 A1 | 8/2020 | Denenberg et al. | |

OTHER PUBLICATIONS

Denzler, P. et al.; "Towards Consolidating Industrial Use Cases on a Common Fog Computing Platform"; 2020 25th IEEE International Conference on Emerging Technologies and Factory Automation (ETFA); Sep. 2020; pp. 172-179; Vienna, Austria.
European Search Report issued for the corresponding European patent application No. EP 22150538.1, dated Jun. 17, 2022, 9 pages (for informational purposes only).

* cited by examiner

*Primary Examiner* — Yuhui R Pan
(74) *Attorney, Agent, or Firm* — VIERING, JENTSCHURA & PARTNER mbB

(57) ABSTRACT

A data verifier, comprising: a first processing circuitry, configured to perform a first safety operation, the first safety operation comprising: determining whether first sensor data representing a second processing circuitry factor satisfy a first verification criterion; and if first verification criterion is satisfied, execute a first safety measure; and if the first verification criterion is not satisfied, execute a second safety measure; a second processing circuitry, configured to perform a second safety operation, the second safety operation comprising: determining whether a first value, generated by a third processing logic from sensor data satisfy a second verification criterion; and if the second verification criterion is satisfied, execute a third safety measure; and if the second verification criterion is not satisfied, execute a fourth safety measure.

17 Claims, 14 Drawing Sheets

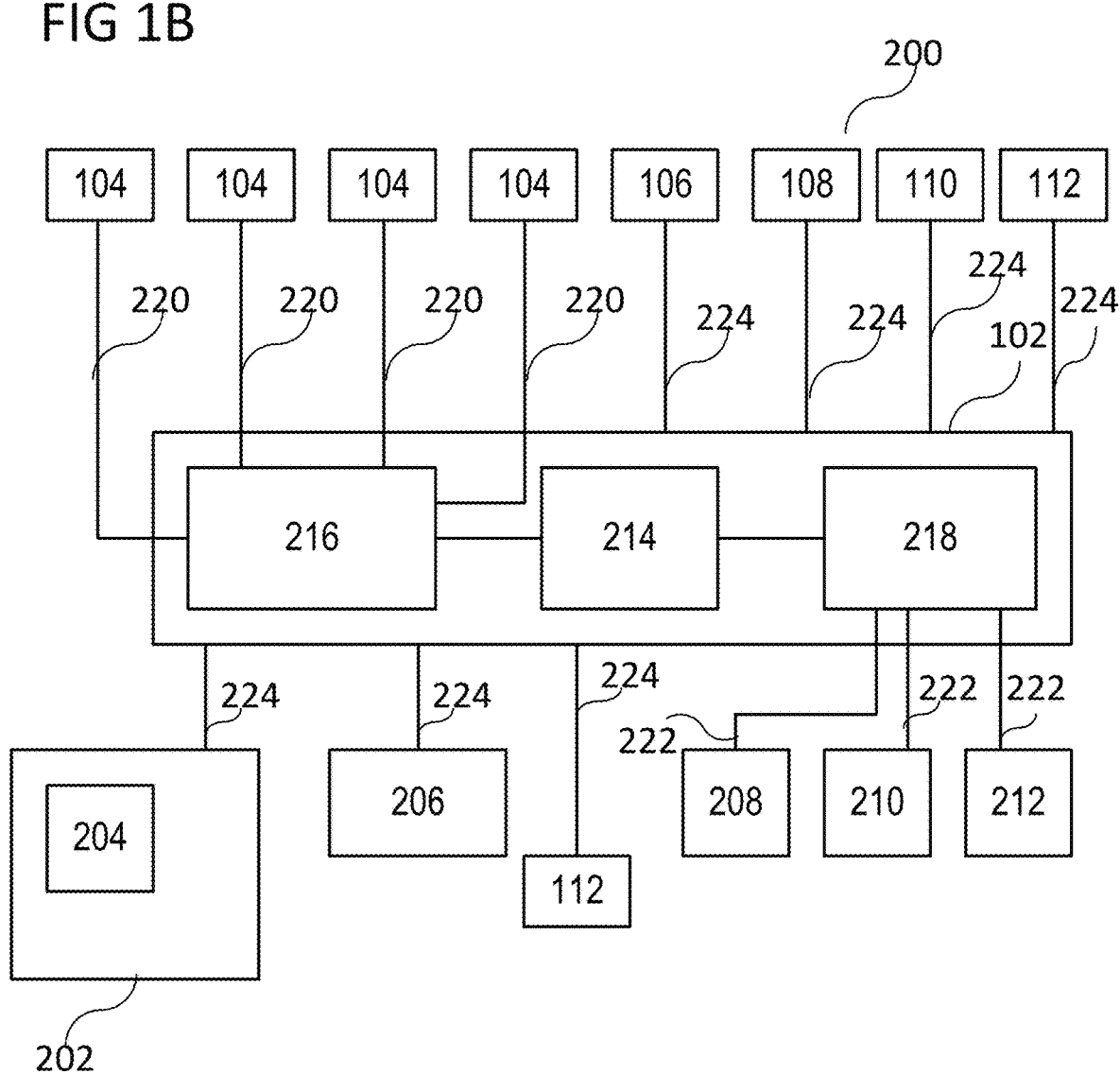

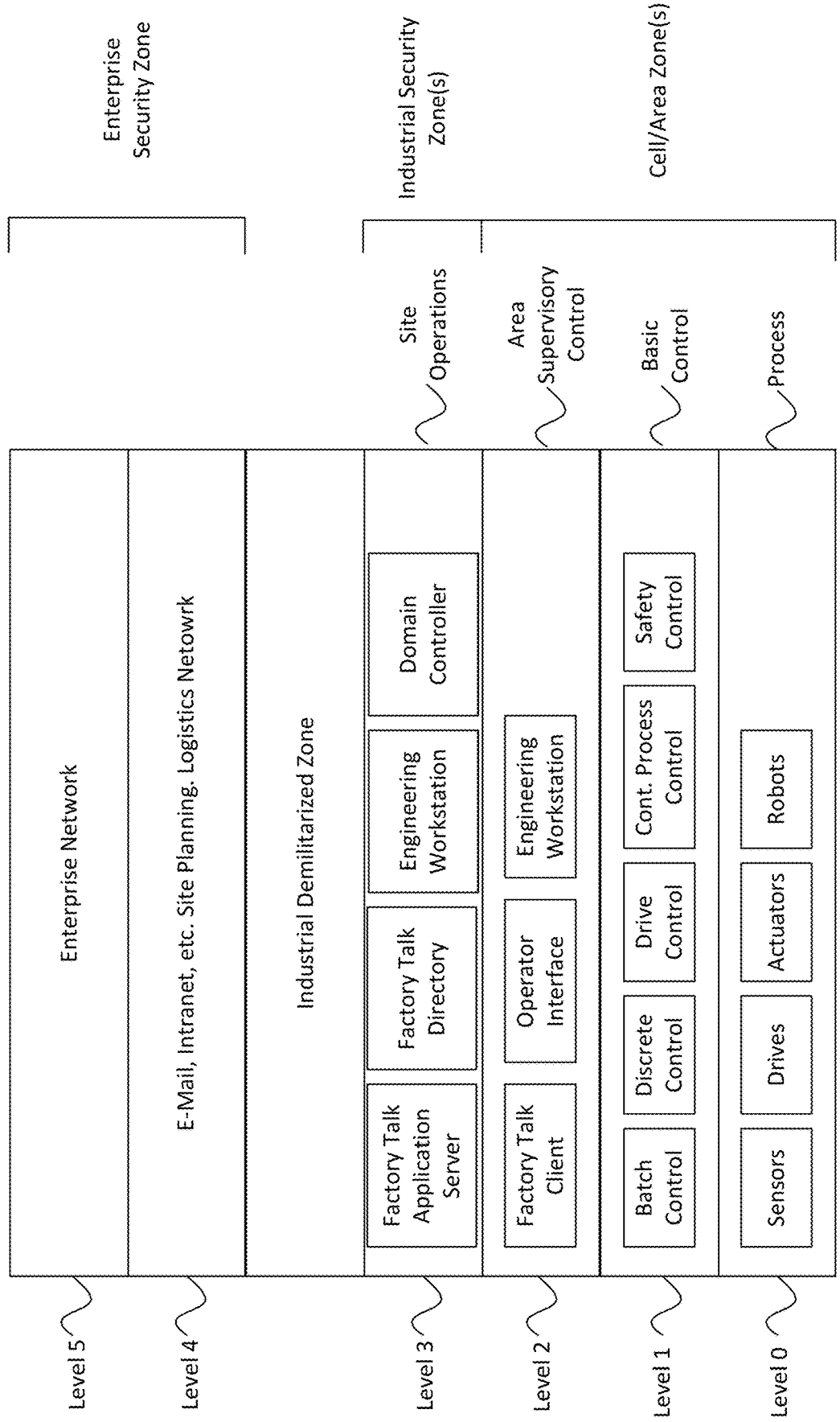

FUNCTIONAL SAFETY WITH ROOT OF SAFETY AND CHAIN OF SAFETY

TECHNICAL FIELD

Various aspects of this disclosure generally relate to functional safety (FS) operations in autonomous vehicles, robots, and industrial control systems.

BACKGROUND

Safety-critical systems, services and applications (e.g., autonomous vehicles, UAVs, satellites, ships, submarines, autonomous or assisted (mobile) robots, (industrial) control systems, and the like) may employ various FS procedures to maintain safe operation. FS may be broadly understood as the absence of unreasonable risk due to hazards caused by malfunctioning behavior of electrical and electronic systems. FS may encompass the overall safety operations of equipment to ensure that the equipment operates properly in response to inputs or failures in a predictable manner. One aspect of FS may be the performance of FS checks, in which equipment (e.g., processors, sensors, etc.) is checked for signs of health.

To maintain FS integrity, an FS system may perform these FS tests using a safety island (SI). An SI may be, for example, a processor that is isolated or otherwise exhibits one or more additional safety factors beyond other processors to be tested. As the number of processors and/or sensors in autonomous vehicles, robots, and Industrial Control Systems (ICS) increases, so too increase the demands upon the SI. Where possible, it may be desirable to use a simple or inexpensive processor for implementation of the SI; however, such processors may become overwhelmed by the volume of FS checks necessary in environments with large numbers of processors and/or sensors.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which:

FIG. 1B shows various exemplary electronic components of a safety system of the vehicle in accordance with various aspects of the present disclosure;

FIG. 2B depicts an industrial model of control hierarchy, according to an aspect of the disclosure;

DESCRIPTION

As the quantity and/or complexity of sensors in autonomous vehicles, robots, and/or industrial control systems increases, so too increase the number of safety operations (e.g. safety related tasks as will be described in detail herein) that must be performed. These safety operations are conventionally performed by an SI, which may natively function on a high safety level (e.g., natively provide a high level of safety). In a conventional implementation, an increase in the quantity of safety operations may necessitate an increase in the processing capability of the SI. This may be costly and/or undesirable for a variety of reasons. Rather than increase the computational capacity of a SI, it is disclosed herein to utilize the SI to perform safety operations on a processing logic with a lower native safety level (e.g. a level that would not normally otherwise permit the processing logic to perform certain safety operations) such that the processing logic operates with an increase safety level (e.g., compared to its native safety level), thus allowing it to perform the desired safety operations.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1A:
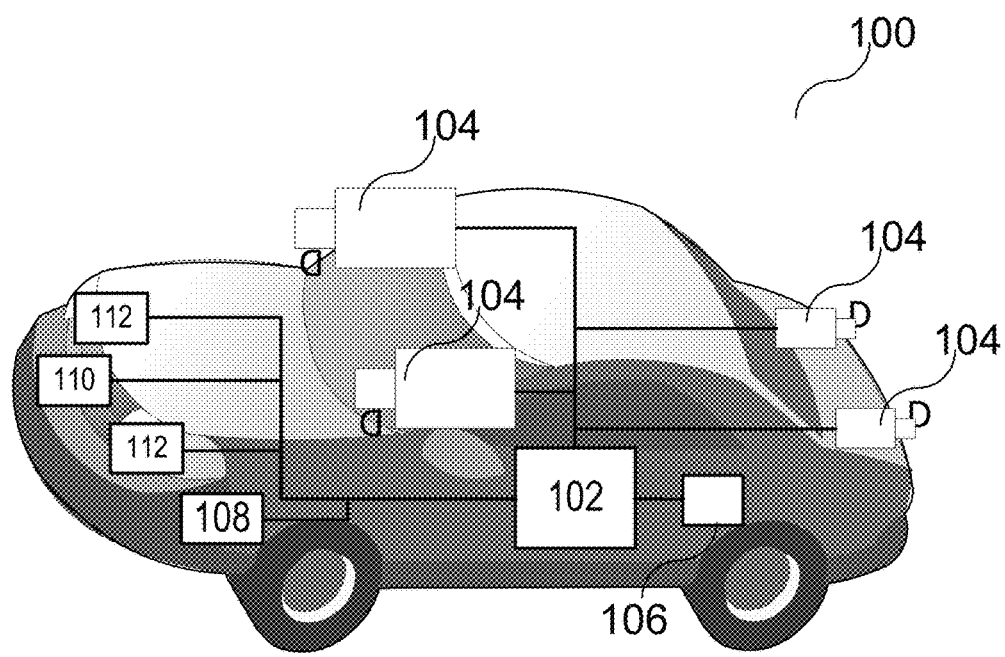
FIG. 1A shows an exemplary autonomous vehicle in accordance with various aspects of the present disclosure.

FIG. 1A shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 1B below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation.

FIG. 1B shows various exemplary electronic components of a vehicle, namely safety system 200, in accordance with various aspects of the present disclosure. In some aspects, the safety system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards.

In some aspects, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Such transmissions may also include communications (e.g., one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and other protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists, robot torque sensors, laser screen sensors, human sensors (e.g., such as sensors to provide positions of humans within a warehouse), and the like. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the safety system 200 as also described with reference to FIG. 1B.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

Figure 2A:
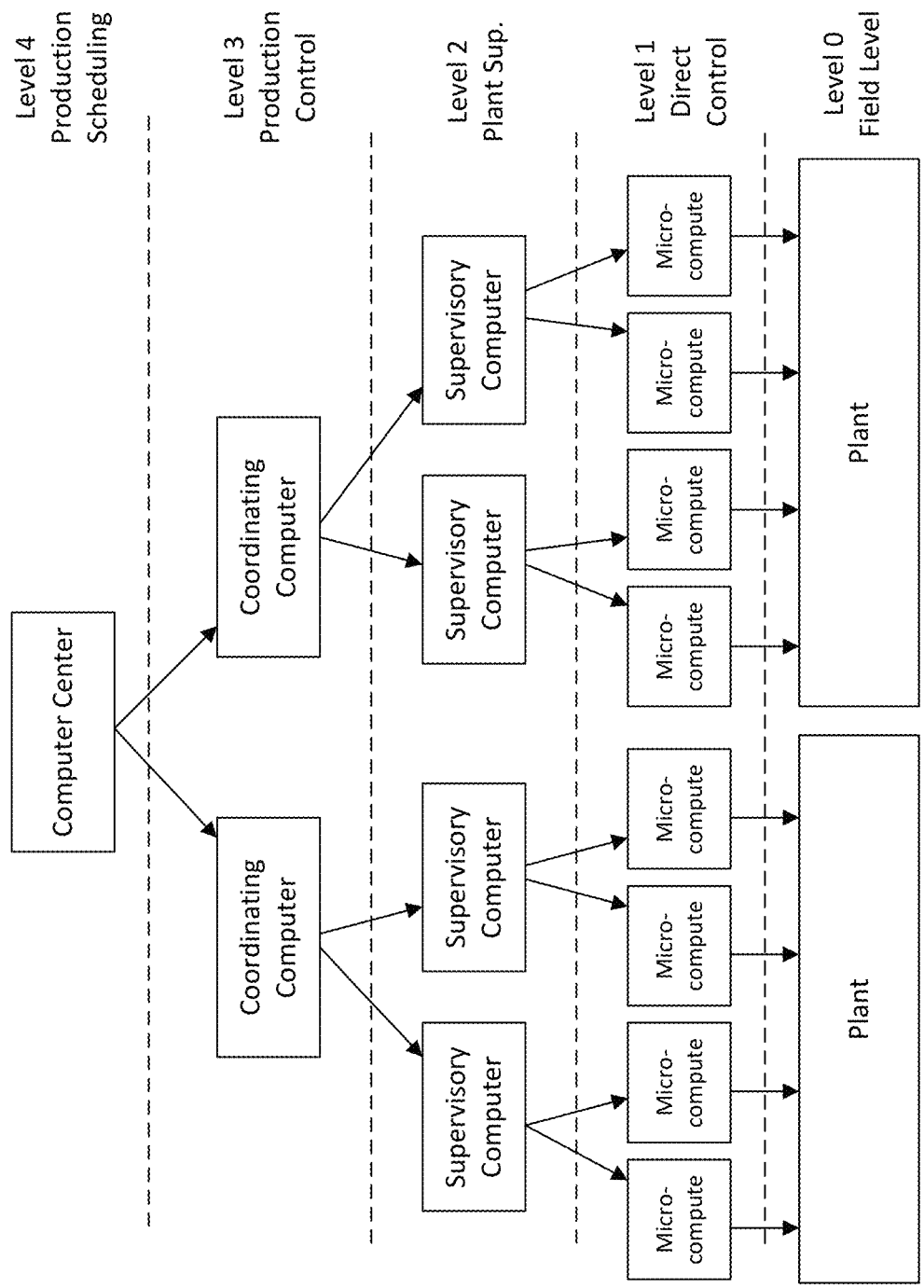
FIG. 2A depicts an exemplary manufacturing control operation according to a distributed control system.

FIG. 2A depicts an exemplary manufacturing control operation according to a distributed control system, according to an aspect of the disclosure. A distributed control system (DCS) may generally be understood as a computerized control system that may be employed for a plant or a particular process (e.g., a manufacturing process, an assembly process, etc.). The DCS may include one or more control loops that utilize autonomous controllers, and wherein there is no central operator supervisory control. DCSs may operate in safety critical process industries.

DCSs may be understood as being particularly reliable, at least due to their distributed control processing around nodes, which may be useful in identifying, containing, and mitigating an isolated failure (e.g., sensor failure, processor failure, etc.).

DCSs may be understood as operating within a function level control schema. The bottommost level, Level 0, may be understood as containing field devices. These field devices often include low-level devices such as flow sensors, temperature sensors, control valves, and the like. The next level, Level 1, may be understood to include industrialized Input/Output (I/O) modules, and their associated distributed electronic processors. Level 2 may include supervisory computers, which may collect information from processor nodes on the system, and provide the operator control screens. Level 3 is understood as the production control level and is generally aimed toward monitoring production and monitoring targets. The highest level, Level 4 is understood as the production scheduling level.

FIG. 2B depicts an industrial model of control hierarchy, according to an aspect of the disclosure. This model may be described in terms of a cell zone, an industrial security zone, and an enterprise security zone.

The cell/area zone may be understood as a functional area within a production facility. This may include, for example, an assembly or sub-assembly process, a repair process, a sorting process, etc. This may vary in size and may be quite small (e.g. a single controller and its associated devices) or may be more complex (e.g., such as multiple controllers). The cell/area zone may be thought of as the set of devices, controllers, etc perform real-time control of a functional aspect of a process (e.g., a manufacturing process). These may all be about to perform real-time communication with one another.

Level 0 may include of a wide variety of sensors, actuators and devices involved in the basic underlying process (e.g., manufacturing, assembly, sorting, etc.). These devices may perform the basic functions of the industrial automation and control system (e.g., driving motors, measuring variables, setting outputs, etc.). These devices may receive direction from, and communicate status with, the control devices in the next level of the model.

Level 1 includes basic controllers that control and manipulate the manufacturing process. The key function of these controllers may be to interface with the Level 0 devices (I/O, linking devices, bridges, etc). Level 1 devices may include, for example, programmable logic controllers. Level 1 devices may make basic decisions using feedback from the level 0 devices.

Level 2 devices may be responsible for control of a specific area, such as a portion of a manufacturing area that is responsible for a specific task or product (e.g., a batch mixing area, a general assembly line, etc.). Level 2 represents the systems and functions associated with the runtime supervision and operation of an area of a production facility.

Level 3, the site level, may describe a high level (e.g., the highest level) of industrial automation and control systems. The level 3 systems and applications may manage site-wide industrial automation and control functions. Levels 0 through 3 are considered critical to site operations.

Level 4 may describe the level in which the functions and systems that need standard access to services provided by the enterprise network reside. This level may be understood as an extension of the enterprise network.

Level 5 includes the centralized IT systems and functions. Enterprise resource management, business-to-business, and business-to-customer services typically reside at this level.

Throughout this disclosure, reference is made to the first processing circuitry and the second processing circuitry, or the SI and the Control CPU, which perform various safety operations, such as with sensor data. Applying these terms to the schematic of FIGS. 2A and 2B, these processing logics and the sensors on which they may rely are typically implemented in layer 1 and/or layer 2. The task scheduler, as described herein, may generally be implemented in Layer 3. The task scheduler may alternatively be referred to at least by task manager, task planner, orchestrator, deployer, scheduler, choreographer, organizer, dispatcher, manager, sequencer, registrar, distributor, and the like. It is specifically noted that the first processing circuitry and the second processing circuitry may alternatively be referred to as a first processing logic and a second processing logic.

Herein is disclosed the use of an SI to verify a second processing circuitry (e.g. a root of safety processor, a root of safety CPU, the "compute/control CPU"), wherein the second processing circuitry performs some or all of the safety operations (e.g., the FS checks) conventionally performed by the SI. The SI may be a processing logic that exhibits one or more additional safety factors compared to other processors and/or may have an independent functional safety certification. The SI may periodically verify the integrity of the FS checks performed by the second processing circuitry. Alternatively or additionally, the SI may determine and/or verify the health of the second processing circuitry or the processor in which the second processing circuitry is implemented. In so doing, the SI may take advantage of its FS certification to verify the calculations and/or health of the second processing circuitry and thus effectively ensure that the second processing circuitry operates at the same level of FS as the SI, a similar level of FS, or an appropriate level of FS, which may be a level that is elevated compared to the FS level that the second processing circuitry would have without SI intervention. Stated otherwise, the SI is understood to offer certain levels of safety assurances beyond that of most other processors. By virtue of the SI checking the health and/or operations of a second processing circuitry, the second processing circuitry may be deemed to operate with the same or similar safety assurances of the SI. In this configuration, the second processing circuitry may have greater computational resources (e.g., may be a more powerful processor) than the SI, and the SI may continue to be implemented in a comparatively simple or inexpensive processor.

According to an aspect of the disclosure, the SI may be implemented as a Root of Safety (ROS) and may use a Compute/Control CPU connected to the SI to perform safety operations (e.g., FS related checks, safety operations, CCWs, ODCCs, sensor checks, any safety workload, etc.). This may include running a time-variant stimulus as sensor data for an safety operation on the Compute/Control CPU (referred to occasionally throughout as the second processing circuitry) and using this data to establish the healthiness of the Compute/Control CPU. Once the SI validates the health of the Compute/Control CPU connected to the SI, the Compute/Control CPU may utilize this status (e.g., the FS status of the SI) to setup a chain of Safety. In so doing, the Compute/Control CPU connected to SI can perform safety operations (including, but not limited to CCWs/ODCC checks on ODCC snapshots run on other Compute/Control CPUs on the network) and still achieve the same FS level as if these checks had been performed on the SI itself. Alternatively, it may be the case that the Compute/Control CPU does not attain the same FS level as the SI, but rather attains a similar FS level, a relevant FS level, and appropriate FS level, which may be a level that is elevated compared to the FS level that the Compute/Control CPU would have had without SI intervention. This may have the effect of reducing overall cost.

Using this configuration, the Compute/Control CPU may be implemented as an ROS that is capable (due, for example, to its greater processing power compared to the SI) of performing more safety operations than the SI, and this additional capacity of the ROS may permit expansion of FS checks beyond what would be possible, were the FS checks to be performed by the SI. In this manner, other/additional sensors and computational resources for safety operations can be added dynamically as necessary as deployable workloads for the actual control/compute purposes. Thus, this creates a scalable solution to adapt FS check algorithms based on the workload that needs to be checked (e.g., the workload specific to one or more sensors that are used to run a safety operation).

As described above, an SI may become overwhelmed by the sheer volume of FS checks it must perform, such as based on the quantity of sensors and/or processors in the autonomous vehicle, the AMR, the ICS, etc. Conventionally, the SI is required to perform or verify these FS checks because of the SI's FS certification. That is, the SI is certified according to a level of FS, and the certification permits the SI to compare results from other processors while maintaining satisfactory FS. Conventionally, in circumstances in which the SI cannot meet the demands (e.g. the volume) of the incoming FS checks, it has been known to replace the SI with a more robust processor, or to otherwise limit the number of FS checks. Neither of the strategies may be desirable.

Figure 3:
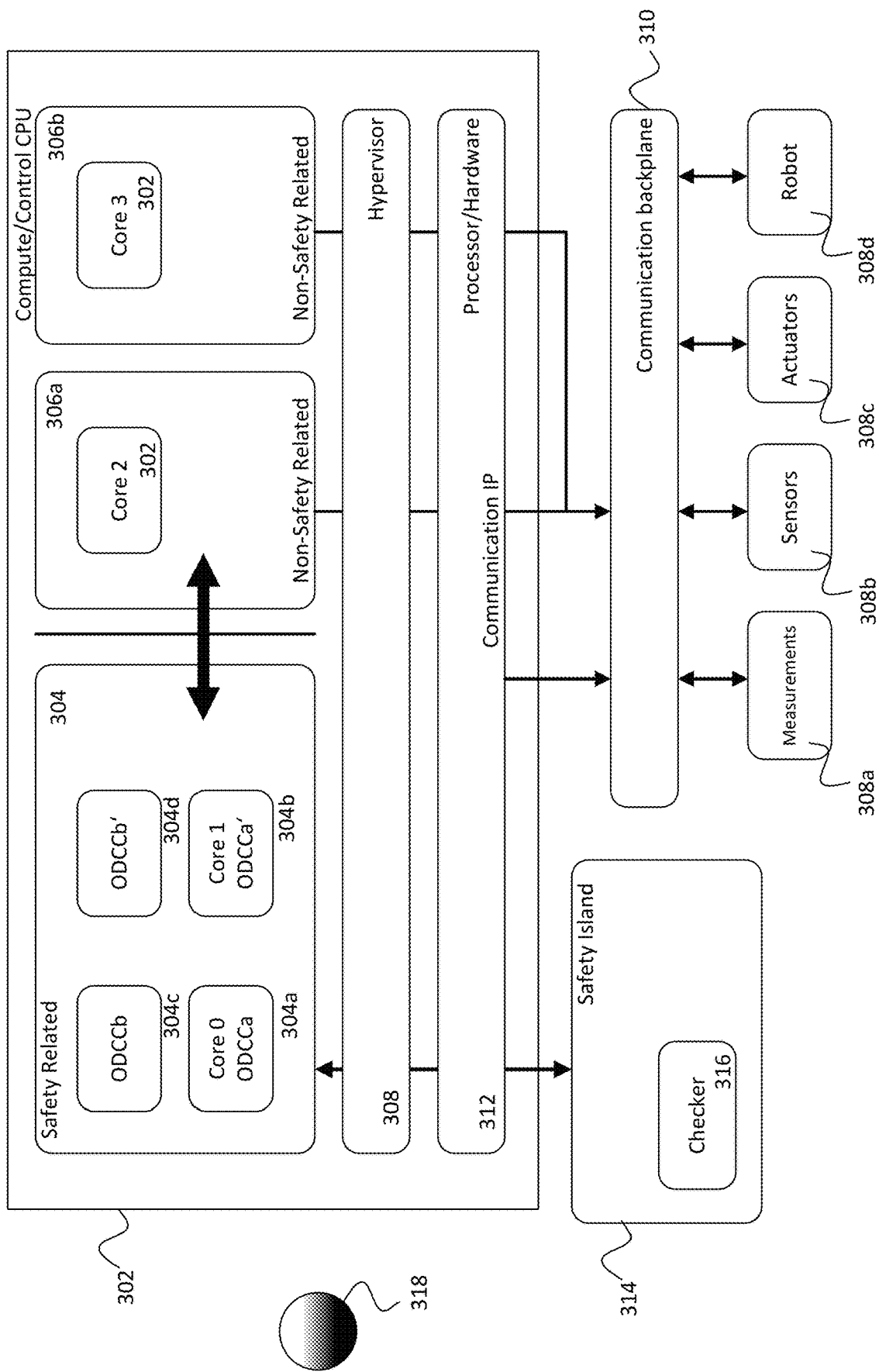
FIG. 3 depicts a high-level block diagram of a conventional FS application.

FIG. 3 shows a high-level block diagram of a conventional FS application. The Control/Compute CPU 302 is partitioned into Safety Related (SR) 304 and Non-Safety Related (NSR) 306a 306b partitions, such as by using a virtual machine emulator 308 (e.g. a hypervisor). At least two cores 304a-d may be assigned to the SR partition 304. The SR partition 304 may run one or more SR workloads. These may be run, for example, on a Real Time Operating System (RTOS) with strict timing requirements.

The at least two cores 304a-d dedicated to the SR partition 304 may run multiple FS algorithms, such as to periodically collect sensor data 308a 308b (e.g., temperature, clocks, interconnects, IPs) related to the health of the chip, the system on chip (SOC), etc. These data may be collected and/or evaluated using Temporal and Logical Monitors (TLM), such as in the form of Standard Test Libraries (STLs) (e.g., tests to periodically monitor the health of the SOC) or specific checks to gather data from external interfaces (e.g., data related to temperature, current drawn, etc.). The at least two cores in the SR partition 304 may receive these data via a communication backplane 310, which may communicate with the SOC 302, for example, using a network communication (e.g. TSN/Ethernet) protocol 312. Additionally or alternatively, such communication may be achieved through simple 2-wire or 3-wire protocols, such as Inter-integrated circuit (I2C), controller area network (CAN), Modbus, or the like. The SR cores 304a-d may run one or more ODCC workloads (depicted in 304c 304d) on the received Sensor Data. For demonstrative purposes, two redundant ODCC workloads are depicted as ODCCa, ODCCa', ODCCb, and ODCCb'. The number of ODCC workloads performed on a given partition is largely a matter of implementation, and the depiction of two redundant ODCC workloads in this figure is not intended to be limiting. The ODCC workloads help increase the diagnostic coverage on not only the SOC but also other interfaces through which sensor data are read in. The ODCC workload may be run on any core or any combination of cores 304a-d of the SR partition. Each core running the ODCC workload may sample sensor data periodically within a time-bound window; compute a signature or a snapshot of the data, such as a sensor data value (e.g. a hash value corresponding to the sensor data, a cyclic redundancy check from the sensor data, etc.) (also referred to as the first value and the second value) and may send the results to the SI 314 (e.g., as a snapshot of the sensor data) for comparison. The SR partition 304 may send this snapshot, for example, via a point-to-point communication or over a network communication connection 312.

The SI may include a checking function (e.g. a "checker") 316, which may be configured to compare the data snapshots of the at least two cores 304a-d of the SR partition 304. If the results (e.g., the snapshots) sent to SI 314 by each of the cores do not match, the SI 314 assumes that the hardware in the SR partition is compromised, such as in the case that the TLM/periodic-STL values do not match the expected values. In this case, the SI may generate and send a signal representing an instruction to abort one or more actions/activities/programs, and/or send a signal to the actuators, wherein the signal represents an instruction to perform an emergency shutdown. In case the TLM/periodic-STL values do not match the expected values, the same applies. The emergency shutdown may be, for example, an instruction to perform a live-man switch 318, where an automatic response is initiated to place the system in a safe state (e.g., without stimulus or affirmative activation, the passive state is switched to off). Such an ODCC snapshot mismatch is considered a critical error and can result in hazardous system failure.

Various control algorithms (which may operate in the SR partition 304 and/or in the NSR partition(s) 306a 306b) may use sensor data 308b to compute and drive actuators 308c. Any decision deemed a critical decision, such as, for example, an instruction to abort or an instruction to perform an emergency stop, should generally be made in the SR partition 304.

Although this conventional system may function acceptably in some implementations, the capabilities of the SI 314 can become a bottleneck for the FS system. That is, as FS systems and the various control algorithms/control systems increase in complexity, so too increases the number and/or complexity of the sensors on which these FS systems and control algorithms/procedures rely. This greater number and/or complexity of the sensors is closely correlated with an increase in the number and/or complexity of safety operation workloads. Also, an increase in the number of safety operation workloads requires additional safety operation checks, additional algorithms to verify the snapshots, more complex algorithms to verify the snapshots, or any of these. This translates into a need for increasingly demanding computational capabilities (e.g. compute) within the SI processor. This results in increased cost, since this generally requires replacing a smaller (e.g. less computationally robust) SI processor with a larger (e.g. more computationally robust) SI processor. For any of a variety of reasons, this may be undesirable. Furthermore, a fixed capacity SI not only limits the number of safety operations that the SI can check, but it also limits the algorithm(s) that can be used for safety operation. Should it become necessary to change/update software in an SI, such as to improve SI performance, the change will require an FS recertification, which is generally undesirable.

Using containerization and task scheduling, along with the powerful computational capabilities of processors, dynamic, scalable, and moveable workloads have become increasingly implementable. Containerization may be generally understood as the packaging of software code, along with any of its dependencies, such that the code can be transferred to, and executed on, a wide variety of computing infrastructures. Task scheduling refers generally to the coordination of computational tasks among multiple processors or interconnected computer systems. It is assumed that the skilled person will be familiar with containerization and task scheduling, and therefore a detailed description of these technologies will not be repeated herein.

Many of the disadvantages of performing safety operations in the SI can be avoided by removing certain safety operations from the SI, and by using the SI to establish an ROS and a Chain of Safety, which enable the FS system to use available/pre-existing computational resources elsewhere (e.g., outside of the SI, on a factory floor, etc.) on which safety operations may be performed. This configuration permits improved utilization of resources that allow for performance of additional safety operations, which can then take into consideration scaling to new sensor data. This configuration also allows for safety operation workloads to occur within the SR partition.

To achieve this, the SI may establish/rely on an ROS and a Chain of Safety. The ROS may be understood as the SI's validation of the health of the Compute/Control CPU (also referred to herein as the second processing circuitry, or a processor on which the second processing circuitry is implemented), and the chain of safety may be understood as the incorporation of other computes with the SR partition to be connected over the Chain of Safety.

Figure 4:
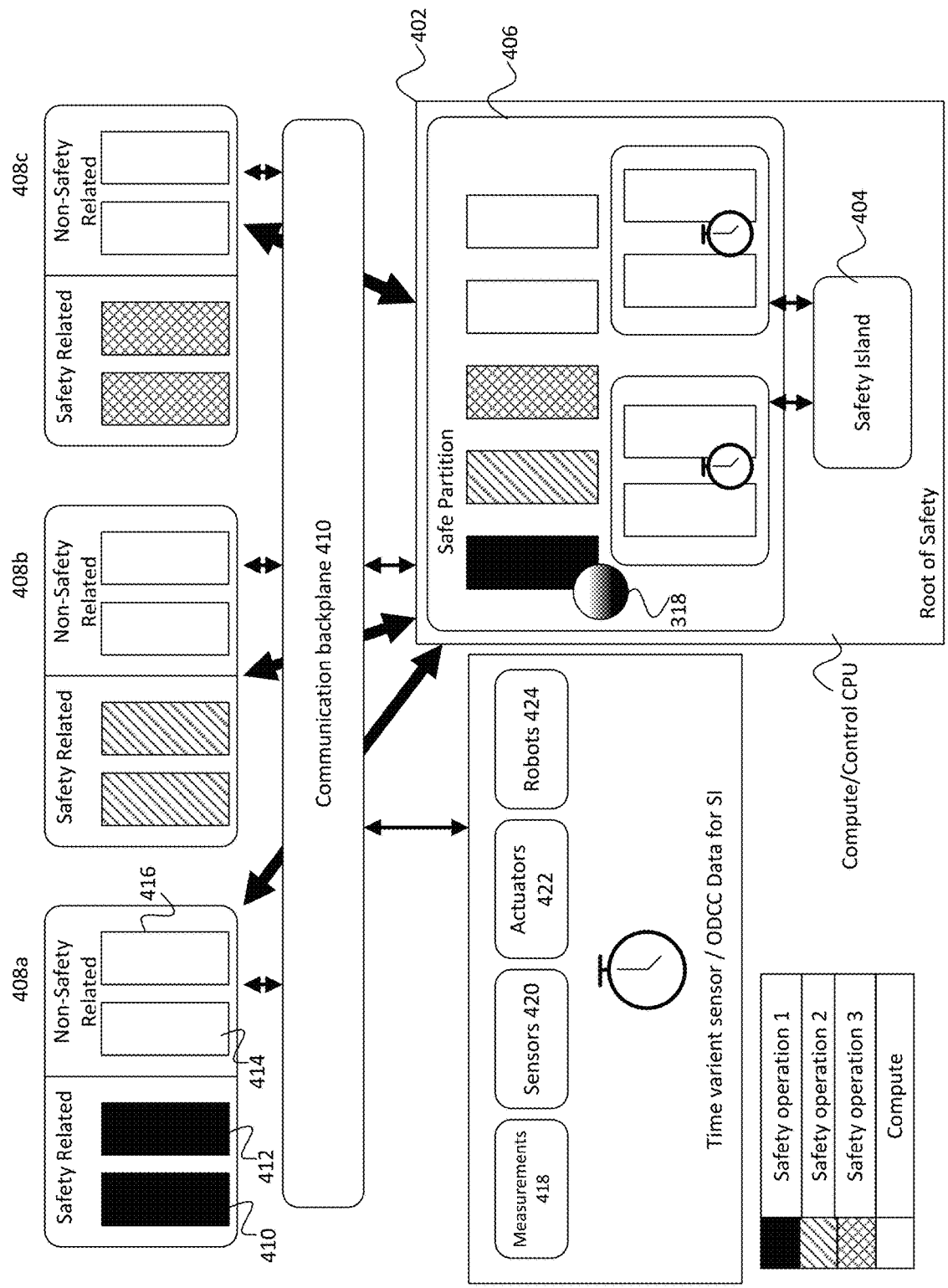
FIG. 4 depicts a processing logic configuration in which a Host CPU with SI connectivity establishes/relies on a Root of Safety and a Chain of Safety.

FIG. 4 depicts a processing logic configuration in which an SI establishes/relies on an ROS and a Chain of Safety. The root of safety 402 may include a first processing circuitry, configured as an SI 404, and a second processing circuitry, configured as a compute/control CPU 406. The SI 404 may be configured in its own logical environment (e.g. in its own logical partition) such that its functions are isolated from a safety perspective from the second processing circuitry 406, even though both may be implemented in the same processor hardware or on the same printed circuit board (PCB)/motherboard. That is, the SI may be an external (external to the compute/control CPU) field programmable gate array, system on chip, microcontroller, or the like, but may be implemented on the same PCB or motherboard.

The SI 404 may be configured to perform one or more safety-related checks.

According to a first aspect of the disclosure, the SI 404 may be configured to perform one or more checks on the health of the second processing circuitry 406 or a processor on which the second processing circuitry is implemented. In that manner, the SI 404 may receive sensor data (the corresponding sensors are not depicted in this figure) representing one or more measurements or conditions of the second processing circuitry 406. These may include, but are not limited to, a temperature of the second processing circuitry 406, a clock speed/processing speed of the second processing circuitry 406, a voltage at any portion of the second processing circuitry 406 compared to a reference voltage, an electrical current into or from the second processing circuitry 406, an integrity of an interconnect of the second processing circuitry 406, or otherwise. The SI 404 may read from a memory including one or more algorithms or standard checks from an STL, which may provide instructions for one or more standard checks relative to the sensor data (e.g., sensor data related to the health of the SOC). That is, the STLs may be used to check the health of the chip 406, whereas the ODCC may be used to check the health of other processors (e.g., LCLS cores). Once both the STL and the ODCC show no errors, the same two cores can be used to run algorithms or procedures for a live man switch, safety functions, boundary checks for sensor values, limit checks for robot arm torque, speed, positions, drive emergency stops, etc. These may include comparing the sensor data to a reference value; determining whether the sensor data is within a reference range or outside of a reference range; comparing data of two sensors; comparing data of two types of sensors; performing one or more algorithms or procedures on sensor data; or any of these. These may be generally understood as determining whether the sensor data fulfill a safety criterion. Assuming that the safety criterion is fulfilled, the SI 404 is assured of the health of the second processing circuitry 406, which therefore provides assurance that both the SI 404 and the second processing circuitry 406 are exhibiting adequate health. The use of a reliable and simple time-variant sensor to run safety operations in 406 allows for simplification of the operating system (e.g., robot operating system, vehicle operating system industrial control operating system, etc.). It is noted that sensor data (e.g., from real sensors 418, 420, and 424) for control algorithms may also be used in 408 for the safety operations (e.g., such as for ODCC). In this manner, the existing sensor data already available for operating the robot/vehicle/industrial control system may also be utilized for the principles and methods disclosed herein. This allows for data from 418, 420, 424 and the Timevarient sensor data depicted in FIG. 4 as safety operation (e.g., such as ODCC) data for 406. This permits a check to be performed within the SI to ensure the health of the LCLS cores of 406, along with STL and SOC specific sensor data, as described above.

By way of example, the SI 404 may perform one or more health checks using sensor data. One such sensor may be a temperature sensor, which provides the SI 404 with sensor data representing a temperature of the second processing circuitry 406. Another such sensor may be a voltage sensor, which provides the SI 404 with sensor data representing a voltage of a portion or node of the second processing circuitry 406 relative to a reference voltage. A sensor may be a current sensor, which provides the SI 404 with sensor data representing an electrical current entering or exiting the second processing circuitry 406. The SI 404, receiving the use sensor data, may be configured to determine whether the temperature of the second processing circuitry 406 is within a predetermined reference range (e.g. a reference range corresponding to a safe range of operation). If the temperature is within the reference range, the SI 404 may consider the safety criterion fulfilled relative to temperature. Similarly, the SI 404 may determine whether the voltage sensor data and/or electrical current sensor data fall within a predetermined range. Assuming that they fall within a predetermined range, the SI 404 may consider the safety criterion fulfilled relative to voltage and/or electrical current. These procedures may be performed relative to the particular sensor data being tested. Although temperature, clock speed, interconnect integrity, voltage, and current have been described herein, it is specifically stated that these health checks may be performed with any variety of sensor data for which satisfaction of a corresponding safety criterion may be an indication of health of the second processing circuitry 406. The examples provided herein are not intended to be limiting.

The second processing circuitry 406 may be configured to register with a task scheduler, which may task one or more external processors with performance of one or more FS tasks, and to verify FS data from the one or more external processors. According to one aspect of the disclosure, the task scheduler may be configured to perform one or more FS task scheduling functions. In this manner, the task scheduler may send signals representing instructions to one or more external processors 408*a-c*, to perform FS tasks. Processors 408*y-c* may be considered as general purpose compute/CPUs, similar to 406, but without the addition of the SI 404. The second processing circuitry 406 and the one or more signals to the external processors 408*a-c* may communicate via a communication backplane 410, which may be configured to enable communication between the second processing circuitry and the external processors such as, for example, via a network communication protocol (e.g., Ethernet). The external processors 408*a-c* may include multiple partitions, such as a SR partition and a non-SR partition.

At this juncture, two types of safety operations for performance on the external processors 408*a-c*, will now be described.

First, the task scheduler may orchestrate or instruct external processors to perform one or more ODCC or other functional safety workloads on external sensor data. These external sensor data may include measurements 418 and/or sensor data from one or more external (e.g. external to the external processor 408*a* performing the ODCC workload) sensors 420. The ODCC may be understood as a logic or software based redundancy technique, which may be categorized under Loosely Coupled Lock Step systems (LCLS). ODCC may increase the diagnostic coverage by running the same exact workload on these two different cores 410 412 and having the state of the safety variables compared, such that any mismatch in state variables is detected by the second processing circuitry 406 (or potentially, as will be described herein, by the SI 404 as part of a periodic verification of the second processing circuitry and/or the processor on which it is implemented) within the Process Safety Time interval, thereby improving overall safety. The various external processors 408*a-c* may include a plurality of cores 410, 412, 414, and 416 (for clarity of the image, only the cores of processor 408*a* are labeled, but it is especially stated that any of the external processors may have a plurality of cores, as depicted by the various blocks within each of the processors). Two or more cores of the external processors 408*a-c*, may receive instructions from the task scheduler to execute safety workloads and to generate corresponding sensor data values (the first value and the second value). As described herein relative to the first ODCC task, these sensor data may be data from any sensors that are external to the processor performing the ODCC workload (e.g. in this case, external to 408*a*), such as sensor data on which one or more control algorithms operations are based.

These sensor data values (the first value and the second value) may be generally understood as signatures of received sensor data, such as a hash determined according to a predetermined function or process, a CRC, or otherwise. Multiple cores in a given external processor (e.g. such as cores 410 and 412 of external processor 408*a*, for demonstrative purposes) may perform the ODCC tasks redundantly, such that each core samples sensor data at the same time or approximately the same time and performs the same sensor data value calculation (e.g., the same hash calculation, the same CDC, etc.) on the sensor data. The external processor having cores that perform the ODCC workload may transmit the sensor data value to the second processing circuitry 406, which may determine whether the received data satisfy a safety criterion. For example, the safety criterion may be that the received sensor data values are identical or within a predetermined tolerance.

The second processing circuitry 406 and the external processors 408*a-c* and/or their cores may be configured to communicate signals using one or more interconnects, such as an on-chip system fabric, or any other interconnect. If the safety criterion is not satisfied (e.g., if the ODCC sensor data values are not identical or within a predetermined tolerance, then the comparison of the sensor data values is treated as an ODCC failure condition, and the second processing circuitry may be configured to generate a signal to implement a safety measure as a result of ODCC failure(s), for example, a live-man-switch.

Second, the task scheduler may task the one or more external processors 408a-c with performing one or more ODCC workloads that are designed to evaluate a health of the one or more external processors performing the ODCC workload. In this manner, and by way of example, the second processing circuitry 406 may task cores 410 and 412 with performance of ODCC workloads, in which sensor information relative to chip 408a is determined (e.g., a temperature of 408a, a processor speed of 408a, a voltage relative to a reference point at 408a, a current drawn from 408a, etc.) and to determine, using a workload library (e.g., an STL), whether these sensor data fall within a predetermined range of acceptability. The cores 410 and 412 may each generate a signature or snapshot of the received sensor data (e.g., a hash, a CRC, or otherwise) and send it to the second processing circuitry 406 via the communication backplane 410. The task scheduler may also deploy the safety function checker (e.g., an ODCC checker) in any available root of safety 406 to match the sensor and algorithm used in 410 and 412.

As stated above, and regardless of whether the cores have performed the first task (e.g., related to sensor data from sensors external to the codes 410 and 412) or the second task (e.g., related to sensor data from sensors that provide information specific to the processor of the cores, such as 408a), the second processing circuitry 406 may be configured to receive the redundantly generated signatures or snapshots of the data and to determine whether they satisfy a safety criterion. According to an aspect of the disclosure, the safety criterion may be that the redundantly generated signatures match or are within a predetermined tolerance of one another.

The results of the second processing circuitry's determination of whether the safety criterion is met is dependent on the given implementation, according to one aspect of the disclosure, the safety criterion may be satisfied if the redundantly generated ODCC data is identical or within a predetermined tolerance. According to one aspect of the disclosure, the second processing circuitry 406 may be configured to generate a signal representing an instruction to perform a safety measure only when the predetermined safety criterion is not satisfied. That is, only when the redundantly generated ODCC data are not identical or not within a predetermined tolerance of one another, will the second processing circuitry 406 generate and send the instruction to perform the safety measure (e.g., such as taking a system off-line, rebooting a system, returning control of the vehicle to a human driver, or otherwise). According to another aspect of the disclosure, the second processing circuitry may be configured to send an instruction to execute the safety measure whenever the safety criterion is satisfied. In this configuration, the control system may require periodic feedback that the safety criterion has been met. In this manner, the second processing circuitry 406 may be configured to determine whether the safety criterion has been met (e.g., the received sensor data values or snapshots are identical or within a predetermined tolerance of one another), and whenever this criterion is met, the second processing circuitry 406 may be configured to generate and send a signal representing a message that the safety criterion has been met. In this configuration, the system may be configured such that the control system is transitioned to a default known safe state unless such a message representing the instruction to execute the safety measure is periodically received.

As described herein, the one or more external processors may be configured to generate the sensor data value (e.g. the signature or snapshot of the sensor data). These processors may be configured to generate the sensor data value at any desired interval. According to an aspect of the disclosure, this interval may be quite rapid, such as every few milliseconds, or less frequent, such as every predetermined number of seconds, minutes, or even hours. The one or more external processors 408a-c and/or their corresponding cores may be configured to generate these sensor data values/signatures using a CRC (such as 32-bit CRC or CRC-32) or any other hashing or signature evaluation algorithm. This sensor data value or signature may be stored along with the other details such as core identifier (ID), workload ID, snapshot ID, type details, and/or timestamp. This combination of data may be referred to as the ODCC snapshot or a safety workload snapshot.

According to an aspect of the disclosure, the ODCC snapshot may uniquely identify the signature corresponding to a given safety workload at any given time during its execution. The ODCC, safety workload, or TLM Library (e.g., an STL) may be customized by overriding and plugging in one or more alternative signature evaluation algorithms.

According to these procedures, the one or more external processors 408a-c may perform assessments of sensor data using STLs, and may transmit these results (e.g. raw results, hashes of the data, hashes of the results, CRCs of the data, CRCs of the results, etc.) to the second processing circuitry 406, which may perform the safety operation. This is in comparison to the conventional procedure, described in FIG. 3, in which the SI 404 was primarily responsible for safety operation. Rather, in this configuration, and as described herein, the SI 404 performs a safety operation on the second processing circuitry 406, which performs safety operations on the data received from the one or more external processors 408a-c.

Figure 5:
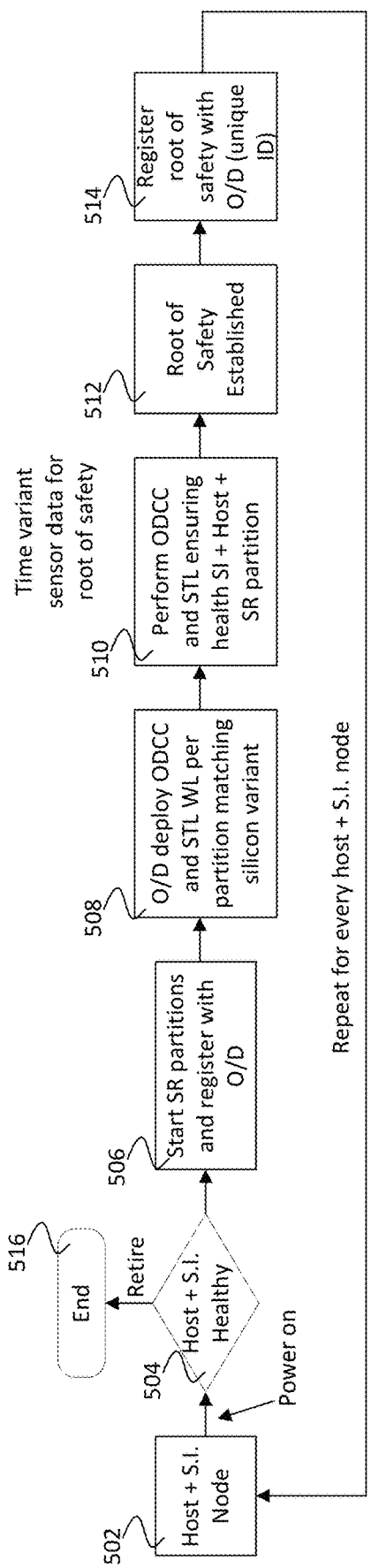
FIG. 5 depicts a workflow for verification of time variant sensor data for the root of safety, according to an aspect of the disclosure.

FIG. 5 depicts a workflow for verification of time-variant sensor data by the ROS, according to an aspect of the disclosure. First, the SI may perform one or more checks on the second processing circuitry 406 to determine whether the second processing circuitry 406 (the "host" in FIG. 5) is healthy 502. If the test results indicate health of the second processing circuitry 406, the SI may send a signal representing a determination that the second processing circuitry 406 is suitable for FS operations/FS workflows. Whether due directly or indirectly to the signal from the SI, the second processing circuitry being able to perform FS operations may include the creation of a SR partition within the second processing circuitry. Such an SR partition may be necessary for the performance of FS workloads/safety operations. The SI and/or the second processing circuitry 406 may register with the task scheduler 506. In this manner, the task scheduler may provide instructions for FS workloads to be performed in external processors (e.g., external to the SI and the second processing circuitry) and verified in the second processing circuitry. The task scheduler may deploy one or more safety operation tasks/safety operation workflows, which may correspond with one or more safety operations, one or more CCWs, one or more ODCC (e.g., using reliable time-variant sensors/sensor data) workflows, one or more STLs, etc. 508. According to an aspect of the disclosure, the task scheduler may be configured to deploy these safety operation tasks, one per partition matching silicon variant. The second processing circuitry may perform checks of the safety operations 510, which may then ensure the health of the SR partition. With this, the health of the SI, the second processing circuitry, and the SR partitions is verified. Upon completing step 510, the ROS is established 512, and the ROS is then registered (e.g. given a unique ID) with the task scheduler 514. In any implementation, there may be a plurality of hosts with SI nodes, and this may be performed for each host/SI node combination. Should there be multiple ROS nodes, redundancy may be established with other ROS nodes to establish a passive ROS, run redundant FS checkers (e.g., such as FS checkers identical to the active ROS), and take over in case an active ROS suffers a failure (e.g., as depicted in FIG. 8).

Figure 6:
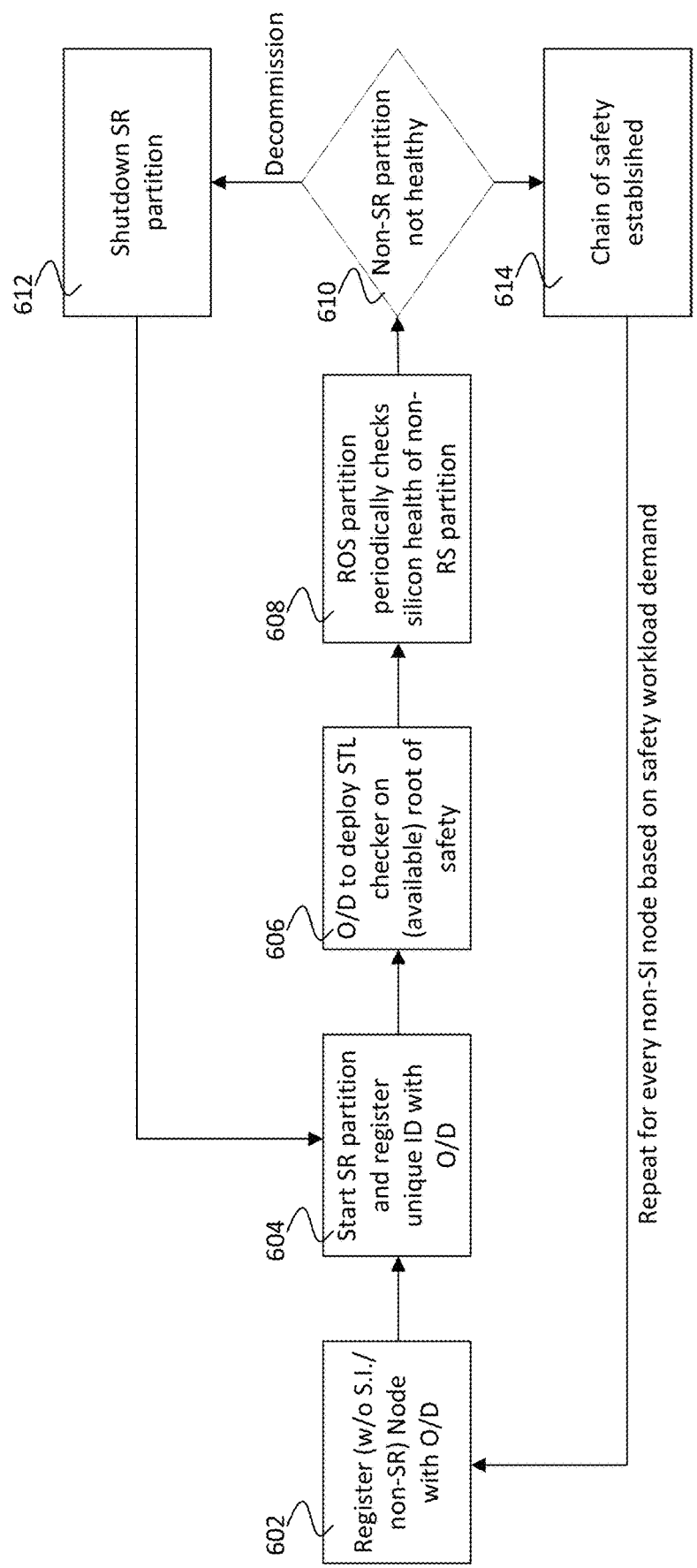
FIG. 6 depicts a workflow for a chain of safety according to an aspect of the disclosure.

FIG. 6 depicts a workflow for a chain of safety according to an aspect of the disclosure. In this figure, a node (e.g., such as a node for performance of an ODCC workflow, a compute, and/or an external processor) such as 408a-408c not having an SI and/or not having a safety-related partition, is registered with the task scheduler 602. The node starts/initializes a SR partition and registers the SR partition with the task scheduler (e.g., a unique ID is assigned to the SR partition) 604. The SR partition can be started dynamically by the task scheduler based on the need for safety. According to an aspect of the disclosure, the SR partition may be started dynamically by the task scheduler, such as based on a need for additional safety. The task scheduler may deploy an STL check on an available ROS 606. The task scheduler can deploy to any available SR (on a root of safety node) with sufficient compute availability. According to an aspect of the disclosure, the task scheduler may deploy FS workloads to any available SR area (e.g., a SR area on an ROS node) having sufficient computational resources (e.g., compute availability). The safety related partition of a node (also referred to herein as ROS) checks the silicon health of the NSR partition 608. It is then determined whether the NSR partition is healthy 610. If it is determined that the NSR partition is not healthy, then the SR partition is shut down 612. If, however, it is determined that the non-SR partition appears healthy, then chain of safety is established 614.

Figure 7:
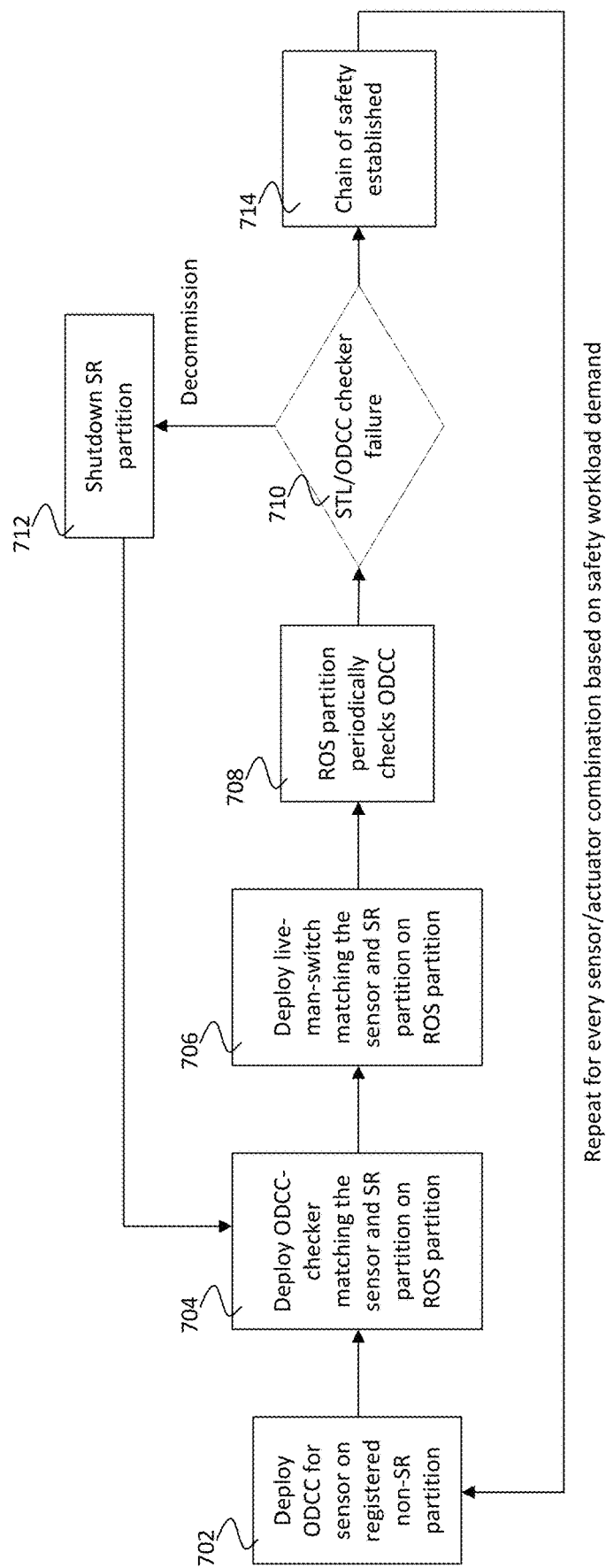
FIG. 7 depicts a workflow to manage a cross-comparison workload according to an aspect of the disclosure.

FIG. 7 depicts a workflow to manage ODCC (or other safety functions for safe operation) according to an aspect of the disclosure. The task scheduler may deploy an ODCC task for a sensor to a registered non-safety partition 702. The ROS partition may be deployed to perform an ODCC checking during which the sensor is matched to the SR partition 704. The ROS partition may deploy live-man-switch (the live-man-switch can be per sensor or per a combination of multiple sensors) matching of the sensor and the SR partition 706. The live man switch may be per sensor or a combination of multiple sensors, gathering data. If the live man switch needs data from multiple sensors and the ODCC-checker is deployed on multiple SR-partitions, the live man switch may collect ODCC-checker results from all SR-partitions. The live-man-switch can be deployed on multiple ROS partitions, such as when the live-man-switch is checking the ODCC for data from a combination of sensors that a safe workload in non-ROS SR partitions is using. The ROS may periodically check ODCC data 708. In the event that an STL/ODCC failure occurs, the corresponding SR partition is shut down 712 (here, the actuator system may be driven to a known safe state), and a new safety partition is reestablished beginning with step 704. If no STL/ODCC/safety functions failure is detected 710 (such as, e.g., an ODCC hash mismatch, a sequence number mismatch, a unique-ID mismatch, a timing mismatch, etc.), the chain of safety is established 714, and the procedure reverts to step 702 for sensor/actuator for other workloads and nodes.

Figure 8:
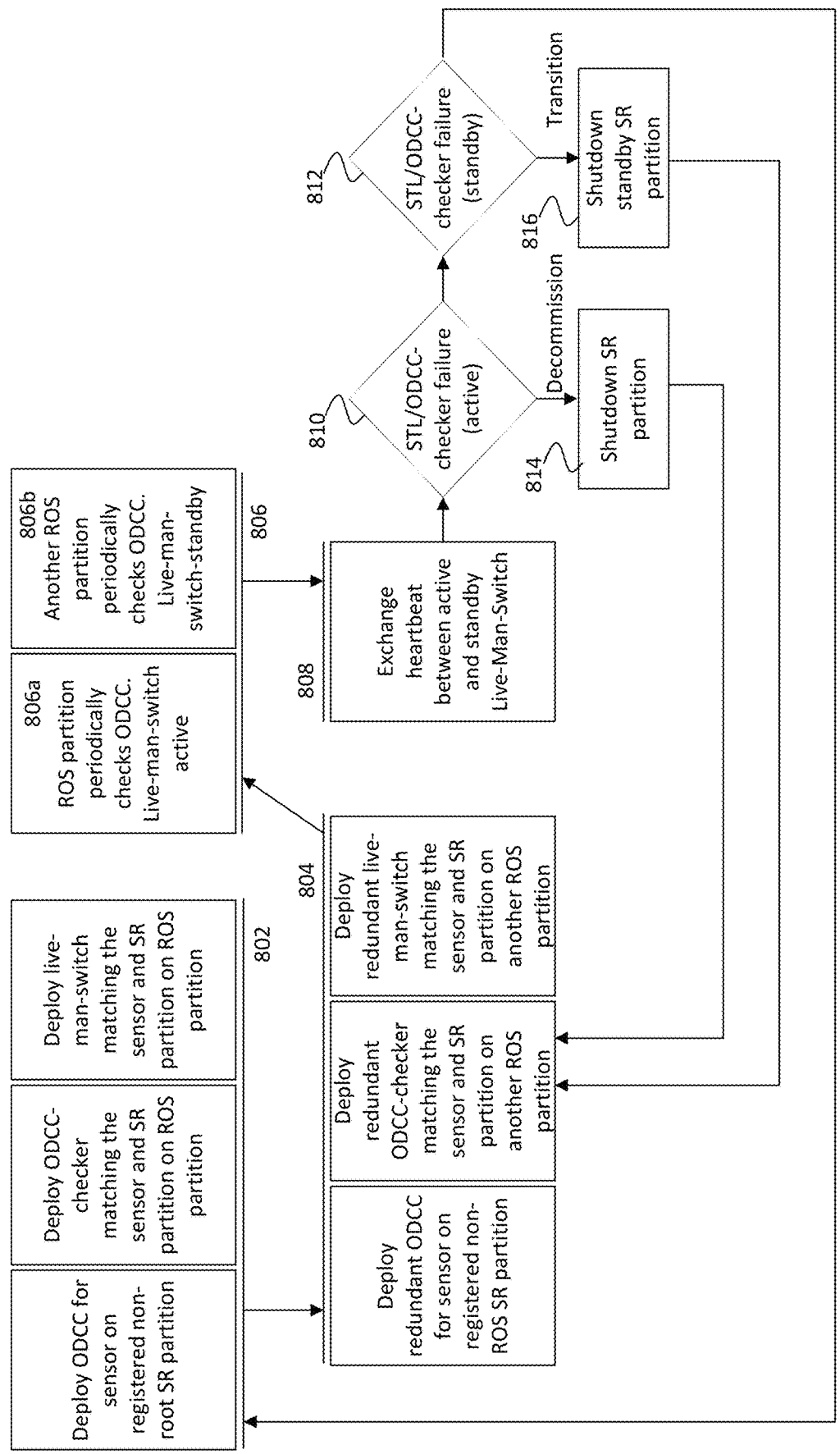
FIG. 8 depicts manageability, availability, and maintenance of the cross-comparison workload procedures described herein.

FIG. 8 depicts manageability, availability, and maintenance of the safety operations described herein. Some elements of this figure are depicted in groups (e.g. 802, 804, and 806) and will be discussed in the context of such groups. For references, group 802, element 806a, element 808, element 810, and element 814 correspond to "active" partitions, whereas group 804, element 806b, element 812, and element 816 correspond to "standby" partitions. In 802, ODCC workflows may be deployed for one or more sensors on a registered non-root of SR partition. An ODCC checker may be deployed to match the sensor and the SR partition on the ROS partition. Live man switch may be deployed by matching the sensor and SR partition on the ROS partition.

In 804, a redundant ODCC may be deployed for one or more sensors on a registered non-ROS, SR partition. A redundant ODCC checker may be deployed to match the sensor and the SR partition on another ROS partition. Redundant live man switch may be deployed by matching the sensor and the SR partition on another ROS partition.

In 806, the ROS partition may periodically check the ODCC. The live man switch may be activated, such as if the ODCC fails. Another ROS partition may periodically check the ODCC.

In 808, a heartbeat may be exchanged between the active and the standby live man switch. In 810, if an STL/ODCC checker failure is actively detected, a shutdown of the corresponding SR partition may be initiated 814. It is noted that when the live man switch is killed, the safety partition may detect that there is no heartbeat from the active live man switch, and the standby partition may take over as an active partition. If the SLT/ODCC failure is detected (e.g. such as in standby mode) 812, the standby SR partition may be transitioned into active mode 816. When the standby partition is transitioned into active mode, the task scheduler may re-create a new SR partition or redeploy previously running workloads onto an existing SR partition of one or more non-ROS nodes. In a maintenance situation, the task scheduler may deploy redundant ODCC/live man switch on the SR-partition of another node. After the SR partition shutdown, the redundant workload may take over. The subsequent restart of the SR-partition can be deployed with an algorithm-updated/security-fixed version of these workloads. This cycle can be repeated until all workloads are updated. This may be repeated for every sensor/actuator combination based on safety workload demands.

In certain implementations, the SI (first processing circuitry) may be required to prompt the generation of a compute/control CPU (second processing circuitry) for verification of one or more safety operations. In this manner, the first processing circuitry may operate on a second processing circuitry. The first processing circuitry may perform one or more actions (described herein as a first safety operation) to determine the overall health of the second processing circuitry. The first processing circuitry may be configured to determine whether first sensor data representing a second processor factor satisfy a first verification criterion. The first sensor data may include, but are not limited to, a temperature of the second processing circuitry, a clock speed of the second processing circuitry, and interconnect integrity of the second processing circuitry, a voltage of a portion of the second processing circuitry relative to a reference voltage, a current entering or exiting the second processing circuitry, or any of these. The second processing circuitry may be configured to determine whether the sensor data satisfy a verification criterion such as whether the sensor data equal one or more predetermined values, or whether the sensor data are within one or more predetermined ranges. If the sensor data satisfy the first verification criterion, the first processing circuitry may determine that the second processing circuitry is healthy.

It is expressly noted that although FIG. 7 and FIG. 8 disclose ODCC checks, these are stated as ODCC checks for convenience only and may be any safety operation, whether CCR, ODCC, a check performed on a single data set, a check performed on a single hash or CRC, a check performed using an STL, or otherwise.

Figure 9A:
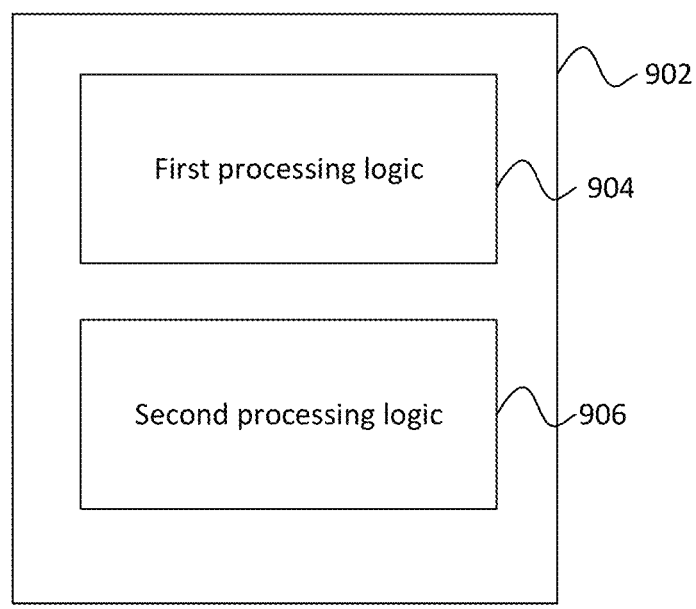
FIGS. 9A and 9B depict a data verifier according to aspects of the disclosure.

FIG. 9A depicts a data verifier system 902 according to an aspect of the disclosure, the data verifier including a first processing circuitry 904 configured to perform a safety operation, the safety operation including: determining whether sensor data representing a second processing circuitry factor satisfy a verification criterion; and if the verification criterion is satisfied, generate a signal representing an approval for the second processing circuitry 906 to perform safety critical tasks.

With reference to FIG. 9A, the second processing circuitry factor may include a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof. In addition or in alternative to and in any combination with the optional features previously explained in this paragraph, the determining whether the first sensor data satisfy the first verification criterion may include the first processing circuitry determining whether the second processing circuitry factor equals a predetermined value. In addition or in alternative to and in any combination with the optional features previously explained in this paragraph, determining whether the first sensor data satisfy the first verification criterion may include the first processing circuitry determining whether the second processing circuitry factor is within a predetermined range. Moreover, in addition or in alternative to and in any combination with the optional features previously explained in this paragraph, the first processing circuitry or the second processing circuitry may be configured to, if the first verification criterion is satisfied, register the second processing circuitry with a task scheduler.

The data verifier systems of FIG. 9A may be implemented at least as a robot, an industrial control system, a vehicle, or any of these.

Figure 9B:
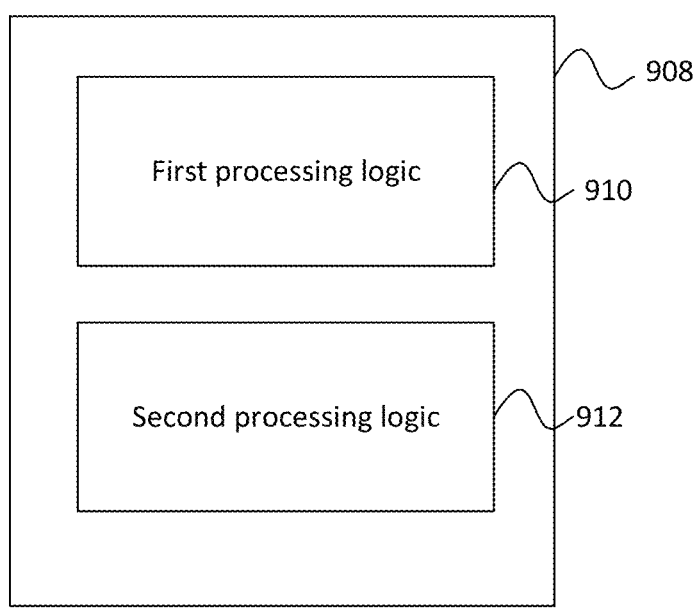

FIG. 9B depicts a data verifier 908 according to another aspect of the disclosure, the data verifier including a first processing circuitry 910, configured to perform a first safety operation, the first safety operation including: determining whether first sensor data representing a second processing circuitry factor satisfy a first verification criterion; and if first verification criterion is satisfied, execute a first safety measure; and if the first verification criterion is not satisfied, execute a second safety measure; a second processing circuitry 912, configured to perform a second safety operation, the second safety operation including: determining whether a first value, generated by a third processing logic from sensor data satisfy a second verification criterion; and if the second verification criterion is satisfied, execute a third safety measure; and if the second verification criterion is not satisfied, execute a fourth safety measure.

With reference to FIG. 9B, the second safety operation may include determining whether the first value, generated by the third processing logic from the second sensor data, and a second value, generated by a fourth processing logic from the second sensor data, satisfy the second verification criterion. In addition or in alternative to and in any combination with the optional features previously explained in this paragraph, first value may include a unique identifier of the third processing logic, and the second value may include a unique identifier of the fourth processing logic, and determining whether the second verification criterion is satisfied may include the second processing circuitry determining whether each of the unique identifier of the third processing logic and the unique identifier of the fourth processing logic corresponds to any of a plurality of trusted identifiers. In addition or in alternative to and in any combination with the optional features previously explained in this paragraph, the second processing circuitry may determine whether the unique identifier of the third processing logic and the unique identifier of the fourth processing logic are identical, and if the unique identifier of the third processing logic and the unique identifier of the fourth processing logic are identical, reassign a safety data workload or to send a signal representing an instruction to reassign a safety data workload. In addition or in alternative to and in any combination with the optional features previously explained in this paragraph, the first value may include an output of a hash function or a cyclic redundancy check as applied to the second sensor data sampled by the third processing logic the second value may include an output of the hash function or a cyclic redundancy check as applied to the second sensor data sampled by the fourth processing logic. In addition or in alternative to and in any combination with the optional features previously explained in this paragraph, the first value may include a first temporal indicator and the second value may include a second temporal indicator, which may each optionally indicate a time of the first value and the second value respectively; and the second processing circuitry may determine whether the first temporal indicator and the second temporal indicator are within a predetermined temporal range. In addition or in alternative to and in any combination with the optional features previously explained in this paragraph, executing the third safety measure may include the second processing circuitry generating an instruction to reboot the third processing logic or the fourth processing logic, and executing the fourth safety measure may include the second processing circuitry generating no instruction to reboot the third processing logic and/or the fourth processing logic. Moreover, and in addition or in alternative to and in any combination with the optional features previously explained in this paragraph, executing the fourth safety measure may include the second processing circuitry generating an instruction to reboot the third processing logic and/or the fourth processing logic, and wherein executing the fourth safety measure may include the second processing circuitry generating no instruction to reboot the third processing logic and/or the fourth processing logic. Moreover, and in addition or in alternative to and in any combination with the optional features previously explained in this paragraph, executing the third safety measure or the fourth safety measure may include generating an instruction to take a processor offline, an instruction to take a sensor offline, an instruction to reboot an operating system, an instruction to perform a test on a sensor, an instruction to perform a test on a processor, or any of these. In addition or in alternative to and in any combination with the optional features previously explained in this paragraph, the second processing circuitry factor may include a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof. In addition or in alternative to and in any combination with the optional features previously explained in this paragraph, the first processing circuitry is a safety island, and the second processing circuitry is a root of safety.

With reference to 9B, the first safety measure may be that the first processing circuitry sends a signal representing an approval for the second processing circuitry to perform a safety check. The second safety measure may be that the first processing circuitry sends no signal representing an approval for the second processing circuitry to perform a safety check, or that the first processing circuitry sends a signal representing an decision that the second processing circuitry may not perform a safety check.

Figure 10A:
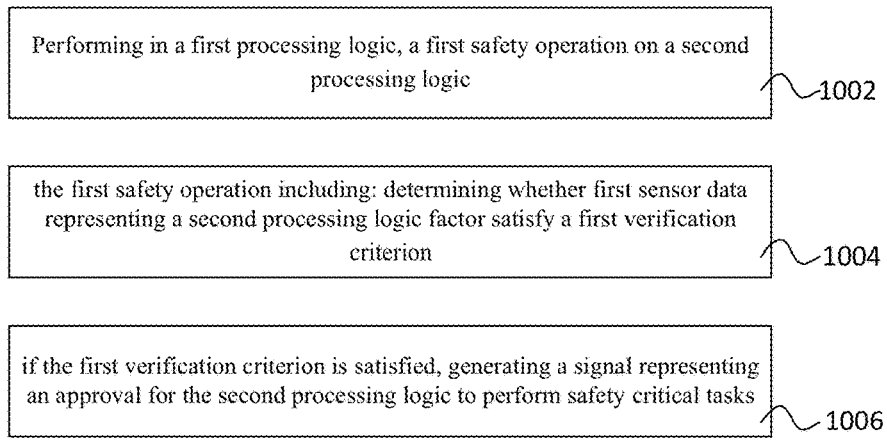
FIGS. 10A and 10B depict methods of verifying data.
Figure 10B:
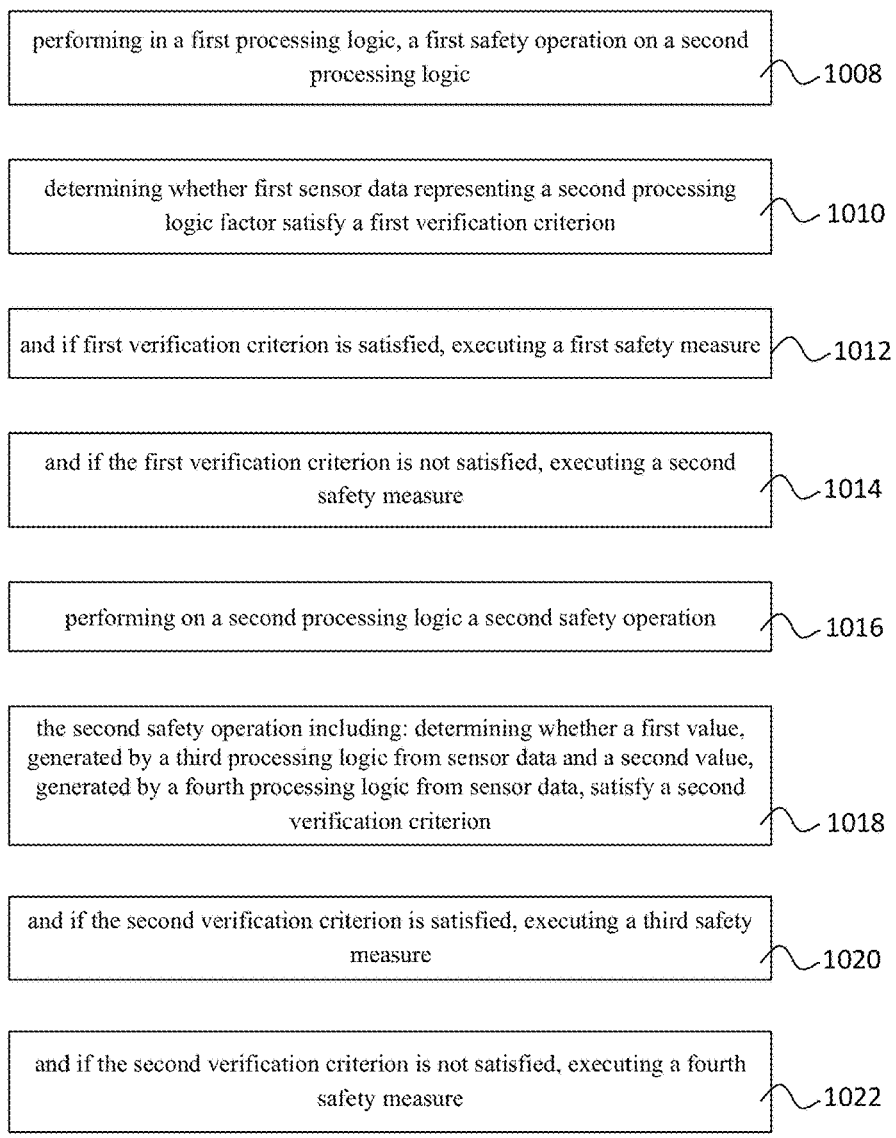

FIG. 10A depicts a method of verifying data, including: performing in a first processing circuitry, a first safety operation on a second processing circuitry 1002, the first safety operation including: determining whether first sensor data representing a second processing circuitry factor satisfy a first verification criterion 1004; and if the first verification criterion is satisfied, generating a signal representing an approval for the second processing circuitry to perform safety critical tasks. FIG. 10B depicts a method of verifying data, including: performing in a first processing circuitry, a first safety operation on a second processing circuitry 1008; determining whether first sensor data representing a second processing circuitry factor satisfy a first verification criterion 1010; and if first verification criterion is satisfied, executing a first safety measure 1012; and if the first verification criterion is not satisfied, executing a second safety measure 1014; performing on a second processing circuitry a second safety operation 1016; the second safety operation including: determining whether a first value, generated by a third processing logic from sensor data and a second value, generated by a fourth processing logic from sensor data, satisfy a second verification criterion 1018; and if the second verification criterion is satisfied, executing a third safety measure 1020; and if the second verification criterion is not satisfied, executing a fourth safety measure 1022.

Once the SI has approved the second processing circuitry for safety critical tasks, it may be deemed a processing logic within a SR. That is, the second processing circuitry may be established as an ROS which may perform one or more safety operations in a trusted environment according to an FS schema.

The second processing circuitry may be configured to perform one or more second safety operations. The second safety operations may include, for example, one or more CCWs, one or more ODCC comparisons, or any safety operation. The second processing circuitry may be configured to receive a first value from a third processing logic and a second value from a fourth processing logic, and to compare the first value and the second value to ensure that they are identical or that any difference between them is within a predetermined tolerance. According to an aspect of the disclosure, the third processing logic and the fourth processing logic may be processing logics located within one or more SRs. The third processing logic in the fourth processing logic may be implemented on one or more processors external to the first processing circuitry and the second processing circuitry, such that the second processing circuitry verifies information from one or more external processors.

The first processing circuitry may be configured to periodically verify the continued functioning of the second processing circuitry. This may involve either or both of the following two options. In the first option, the first processing circuitry performs a check of the health of the second processing circuitry. That is, the first processing circuitry may verify sensor data representing a temperature, a clock speed, and interconnect integrity, a voltage, and electrical current, or otherwise, or any of these, and if these data are equal to predetermined values or are within a tolerance of one or more predetermined values, the first processing circuitry may further accept and/or further certify the health of the second processing circuitry. In the second option, the first processing circuitry may receive the first value and the second value from the first processing circuitry (or alternatively directly from the third processing logic in the fourth processing logic) and may perform an independent verification, such as an independent ODCC check to determine that the ODCC check of the second processing circuitry is accurate. In so doing, the first processing circuitry verifies the accurate operation of the second processing circuitry. Because the first processing circuitry is an SI, some or all of the safety certification of the first processing circuitry may be applied to or imparted upon the second processing circuitry, thereby rendering the second processing circuitry a trusted source (e.g. a root of safety).

According to an aspect of the disclosure, the first processing circuitry and the second processing circuitry may be virtual processors and/or separate logical partitions. The first processing circuitry and the second processing circuitry may be implemented on separate processors. In this manner, the first processing circuitry may be the SI, and the second processing circuitry may be the non-SI. In this manner, the first processing circuitry may be configured to verify the reliability and the safety of the second processing circuitry. It is expressly stated that any implementation described herein with respect to the first processing circuitry and the second processing circuitry operating as separate logical partitions may alternatively be implemented using two separate processors.

The second processing circuitry may be configured to perform the safety operations periodically. The frequency with which the checks are performed may be determined based on the desired implementation, and may range from very frequent to very infrequent. For example, the ODCC checks may be performed every millisecond, every second, every minute, every hour, every several hours, or any interval in between.

According to an aspect of the disclosure, the first value may include a unique identifier of the third processing logic and the second value may include a unique identifier of the fourth processing logic. It may be desirable to ensure that the first value and the second value are calculated by different processors, or at least by different processing logics. This may permit certain errors to be detected that may not otherwise be identifiable, were the first value in the second value to be calculated by the same processor and/or the same processing logic. Thus, the second processing circuitry may be configured to receive a first unique identifier of the third processing logic and a second unique identifier of the fourth processing logic, and to compare/contrast these unique identifiers. Assuming that the unique identifiers are not the same, the second processing circuitry may ensure that the first value and the second value were created by different processing identifiers, and thus by different processing logics/by different processors. If the second processing circuitry were to determine that the first unique identifier and the second unique identifier are the same, this would strongly suggest that the same processing logic carried out the algorithm or workflow to arrive at the first value in the second value, and thus a comparison of the ODCC data may have reduced value. In this case, the second processing circuitry may send an instruction (e.g., such as an instruction to the task scheduler) to re-task the processors/processing logics to ensure redundant ODCC workflows by different processors or processing logics.

According to an aspect of the disclosure, the first value and the second value may be configured as a signature of sensor data. The third processing logic in the fourth processing logic may be configured to sample sensor data and to generate a signature of the sensor data (also referred to as a snapshot of the sensor data) for sending to the second processing circuitry and for comparison by the second processing circuitry. As described herein, these sensor data may be any sensor data without limitation. According to one aspect of the disclosure, the sensor data may be sensor data relating to the health of the processor or processors on which the third processing logic and the fourth processing logic are implemented. Such sensor data may include, but are not limited to, a temperature of the relevant processor or processors, a clock speed of the relevant processor or processors, and interconnect integrity of the relevant processor or processors, a voltage of the relevant processor or processors compared to a reference voltage, a current entering or exiting from the relevant processor or processors, or otherwise.

According to another aspect of the disclosure, the sensor data may be data related to a driving application. Autonomous vehicles rely on a plurality of sensors and actuators to perform various autonomous driving operations (e.g. to operate the vehicle safely). It may be desired/necessary to test any of these sensors and/or actuators periodically to ensure safe operation. In this manner, the third processing logic and the fourth processing logic may be configured to sample any sensor data for operation of an autonomous vehicle and/or any data related to the operation of one or more actuators. The third processing logic and fourth processing logic may be configured to generate a signature (e.g. a snapshot) of the received autonomous driving sensor data and to send these signatures to the second processing circuitry for comparison/evaluation. Alternatively or additionally, the third processing logic and fourth processing logic may be configured to implement one or more testing workflows or testing algorithms on the sampled sensor data to ensure that the sample sensor data is within a predetermined range.

According to an aspect of the disclosure, the signatures included within the first value and second value may be implemented as a hash value or a CRC. In this manner, the third processing logic and fourth processing logic may be configured to implement one or more hash generation workflows to create a hash value from the received sensor data. Alternatively, the data signature may be configured as a CRC, and the third processing logic and fourth processing logic may be configured to send the CRCs to the second processing circuitry for comparison/evaluation.

In addition to ensuring accuracy of sensor data, and health of the relevant processors, it may be desirable/necessary to ensure temporal integrity. For example, it may be necessary to ensure that the third processing logic and fourth processing logic are able to sample sensor data, perform one or more workflows on sensor data, send sensor data, or any of these within a predetermined temporal tolerance. That is, autonomous driving requires that data be appreciated and responded to rapidly, and various safety certifications place tight restrictions on latency in processing sensor data. Thus, it may be necessary to ensure that the third processing logic and fourth processing logic are able to process data according to one or more temporal restrictions. In this manner, the first value and second value may include a timestamp or other temporal indicator. This timestamp or temporal indicator may evidence a time at which the third processing logic and fourth processing logic received sensor data, performed a workflow on sensor data, generated a signature (snapshot) from the sensor data, or otherwise. The second processing circuitry may be configured to determine whether the temporal indicator from the third processing logic and fourth processing logic satisfy a temporal criterion, such as ensuring that a maximum latency is not exceeded. If the temporal criterion is not met, the second processing circuitry may be configured to initiate a safety measure.

According to an aspect of the disclosure, implementing a safety measure may include the second processing circuitry generating and/or sending an instruction for the third processing logic and/or the fourth processing logic (e.g. the partitions on which these processing logics are located) to be deleted. According to other aspects of the disclosure implementing the safety measure may include the second processing circuitry generating and/or sending an instruction for a processor implementing the third processing logic or fourth processing logic to be taken off-line, for one or more corresponding sensors to be taken off-line, for one or more systems to be rebooted, for a handoff operation in which control of the vehicle is returned to a human driver, or otherwise, or any of these.

In some instances, the implementation of the safety measure is described as implementing a third safety measure, and in other instances it is described as implementing a fourth safety measure. This is done at least to distinguish between configurations in which the autonomous driving system is configured to operate unless it receives a message indicating that a safety measure has been implemented, and other circumstances in which the autonomous driving functions are configured to cease unless they receive confirmation that a safety measure has been implemented.

Communication between the second processing circuitry and the third processing logic/fourth processing logic may occur through a communication backplane. The communication backplane may utilize one or more network communication protocols (e.g., Ethernet), to so as to allow rapid communication that can be directed between an intended sender and an intended recipient. To enable this communication, the sender and receiver may include a modem, configured to convert data received from the respective processing logic to one or more signals representing the received data for transmission to the other processing logic.

The fulfillment of a safety criterion, relative to assessment of sensor data, may be configured according to at least one of two alternative models, described herein for convenience as the (1) "proceed unless model" or the (2) "stop unless model". Under the "proceed unless model," the relevant SR processor(s) may be considered safe unless or until the second processing circuitry reports an error, or similarly, the second processing circuitry will be considered as safe unless or until the first processing circuitry detects or reports an error. Under this model, a fulfillment of a safety criterion (e.g. indicating that the temperature, voltage, or electrical current is within a predetermined acceptable range) is indication of continued sensor health, and the SI need not generate and/or send an additional signal representing a further confirmation of health. Should a safety criterion be unfulfilled (e.g. the processor is operating at a high temperature, outside of the acceptable range), the SI may generate and send a signal representing a message to implement a safety procedure. In this manner, the safety procedure may correspond to an instruction to abort one or more actions and/or to turn control of the vehicle to a human operator.

According to the "stop unless model," continued autonomous operation requires ongoing active confirmation from the SI 404 of the satisfactory health of the second processing circuitry. In this manner, the SI 404 will, upon fulfillment of a safety criterion (e.g. indicating that the temperature, voltage, or electrical current is within a predetermined acceptable range), generate and send a signal representing a confirmation of the continued health of the second processing circuitry. Under this system, such continued confirmations of the health of the second processing circuitry must be received within predetermined intervals, and a failure to receive such a confirmation from the SI 404 within the predetermined interval may be understood A sufficiently time-variant stimulus (e.g., a sine wave) may act as input for the safety operation. That is, the SI may check the second processing circuitry (e.g. its health, its calculations, etc.) on a schedule according to the time-variant stimulus, and/or the second processing circuitry may perform a safety operation on a schedule according to the time-variant stimulus. The SI may check the ODCC snapshots sent periodically and may validate that the connected SOC is healthy. Actual ODCC workloads to be run on sensors can be offloaded to other available compute/worker nodes (say on the factory floor), which now send ODCC snapshot periodically to Compute/Control CPU connected to the SI. The ODCC check can be performed by the Control/Compute CPU, as it is periodically validated to be healthy by the SI.

This gives the benefit of not only scaling the safety operation with a much powerful processor (compared to the conventional SI), but also brings in existing compute into the FS Chain of Safety enabling better utilization of resources. Addition of new sensors and safety operation algorithms can now be run on much powerful Compute/Control CPUs, instead of a simple low power, low cost SI implementation.

In a conventional ODCC implementation, two processors external to the SI receive sensor data related to the health of a processor, a chip, a system on chip, an integrated circuit, or the like. The two processors perform any of a number of standard tests on the sensor data and each send a snapshot of the results to the SI. The SI, in turn, compares the results from the two processors and determines whether various criteria have been satisfied. For example, two processors sampling sensor data at generally the same time and performing identical calculations on the sensor data would be expected to reach similar conclusions at similar times. The SI may compare these two conclusions to determine whether there are sufficiently similar in value (e.g., the results are identical or nearly identical) and/or in time (e.g., the results were completed and/or arrived at the same time or within a predetermined tolerance of the same time). The SI may, for example, receive signals representing redundant sensor data or redundant calculations made from sensor data. That is, sensor data may be obtained, and optionally processed, on two or more processors, and these data or values representing the processed sensor data, may be sent to the SI. In this manner, the SI may compare the sensor data and/or the values derived from the processed sensor data.

Alternatively or additionally, processors performing any of a battery of predefined tests may utilize these sensor data to assess the health of another processor. For example, if it can be determined that a given processor is exhibiting certain attributes (e.g. related to temperature, clock speed, interconnect integrity, a processor voltage relative to a reference voltage, drawing a current, or any of these), this may indicate that the processor is able to satisfy its duties or is otherwise "healthy".

Other aspects of the disclosure related to FS as a managed and distributed system will now be disclosed.

Conventional FS workloads generally utilize fixed function software implementations and are usually tightly coupled to a specific hardware and software environment on which they operate. This limits the scalability, manageability, and configurability of a control system running on FS workloads. Any change or updates such as an addition of new sensors, actuators, security updates or firmware changes, potentially results in the requirement to perform manual, often tedious, updates to the FS workload with long system downtime. Further, in case of a node failure, conventionally implementations do not allow easy transition of FS workloads onto other available nodes, thereby increasing system downtime. Conventional FS implementations may hinder transition of a Functionally Safe control system into a distributed, managed and a fully autonomous Functionally Safe control system.

Returning to FIG. 3, this figure shows a Control/Compute CPU partitioned into SR and NSR partitions using a virtual machine emulator (e.g. a hypervisor). A minimum of two cores are assigned to the SR partition. The SR partition may run SR workloads and may also runs on an RTOS with strict timing requirements.

Two cores dedicated to the Safety partition may run multiple FS algorithms to periodically collect data related to the health of the SOC, as described above. These TLMs may be in the form of STLs or specific checks to gather data from external interfaces related to temperature, current drawn, etc. ODCC workloads may be run on Sensor Data. These ODCC comparisons may assist in increasing the diagnostic coverage on the SOC, as well as on other interfaces through which sensor Data is read in. The ODCC workloads may be run on each core of the SR partition. The ODCC workload on each core may sample sensor data at a pre-determined periodicity and within a time bound window, compute a hash or CRC, send the results as a snapshot to the SI or second processing circuitry, depending on the implementation, for comparison. If the snapshot received by the SI or the second processing circuitry, depending on the implementation, from both the cores does not match, it may be considered as a fault (Hardware and/or Software) in the SR partition and may require aborting or sending an emergency shutdown instruction to the actuators. Alternatively or additionally, emergency shutdowns may be performed as a Live-man switch, during which control is returned to a human operator.

STL execution may be CPU/SOC specific and thus may be dependent on firmware running on multiple IP blocks of the SOC. The STL may require performance of checks on the Core and non-core components of the SOC and may validate that the SOC is healthy and safe to continue its operation.

On Demand Proof Test (ODPT) may be triggered when a full check on the system is necessary. This typically involves shutdown/reboot of the setup and downtime of the system. The following concepts will be described herein with respect to ODCC; however, it is expressly stated that that may apply be applied to TLM, ODPT or any other FS workload.

Figure 11:
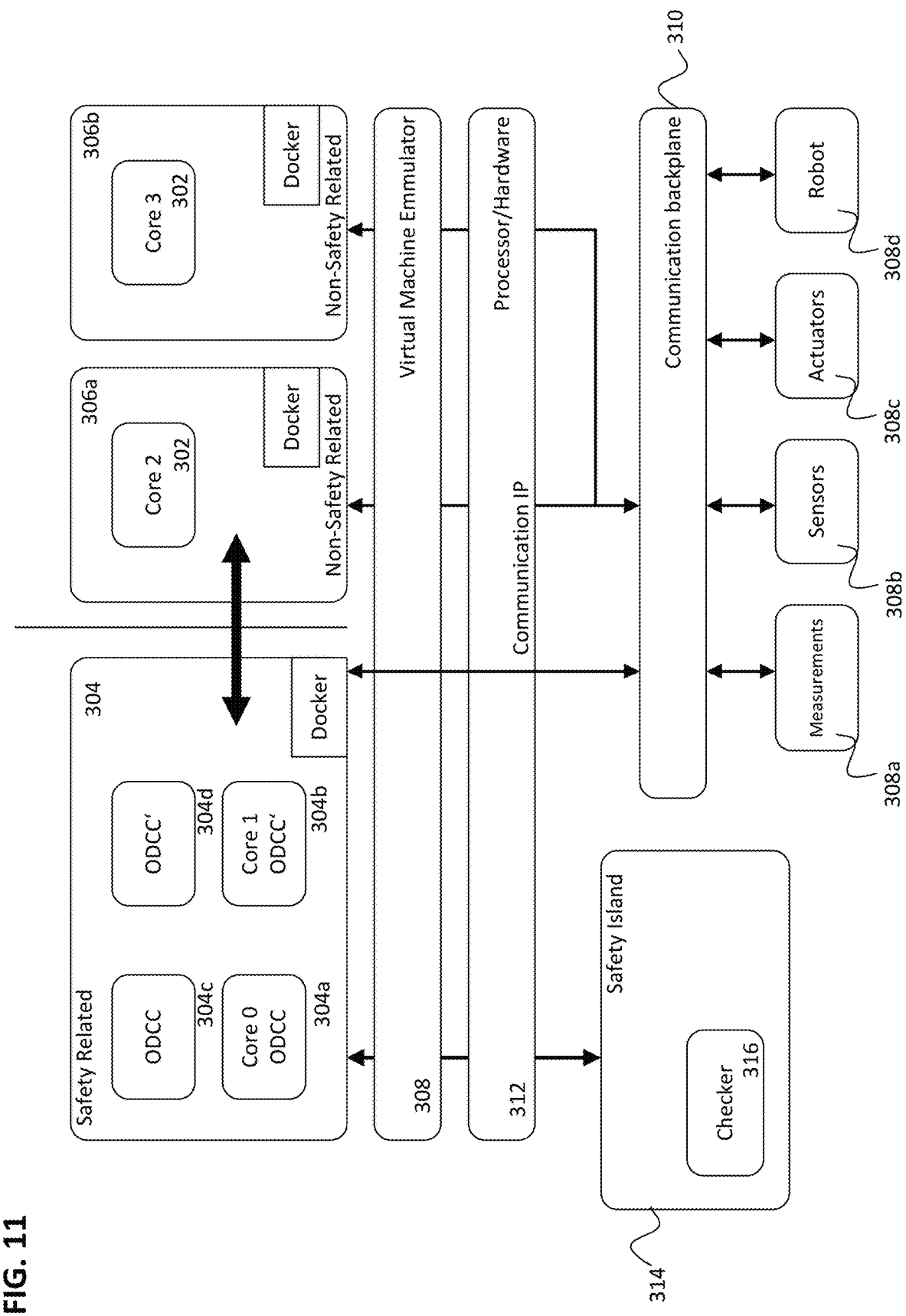
FIG. 11 depicts a distributed FS workload.

FIG. 11 depicts a distributed FS workload, according to an aspect of the disclosure. In this figure, FS workloads may be converted as microservices through use of a containerization software (e.g., Docker) and task scheduling software (e.g., Kubernetes). These FS workloads (algorithms) may then be run on desired hardware relevant to sensors and actuators that pose a hazard risk, in case of a fault. Redundancy and failover mechanisms of distributed architecture may be used to redeploy FS workloads and keep the system operational with minimal downtime. FS workloads and algorithms may be updated and managed to accommodate any new addition of sensors/actuators, firmware updates, security fixes etc., with the benefits microservices based architecture.

According to an aspect of the disclosure, the manageability, scalability, and high availability of microservice-based workloads, can be utilized to realize benefits specific to FS workloads by utilizing Functional Safety as a Service (FSaaS). Various benefits of this aspect may be seen in FIG. 12, which depicts a higher-level view of multiple instances of the setup shown in FIG. 11.

Figure 12:
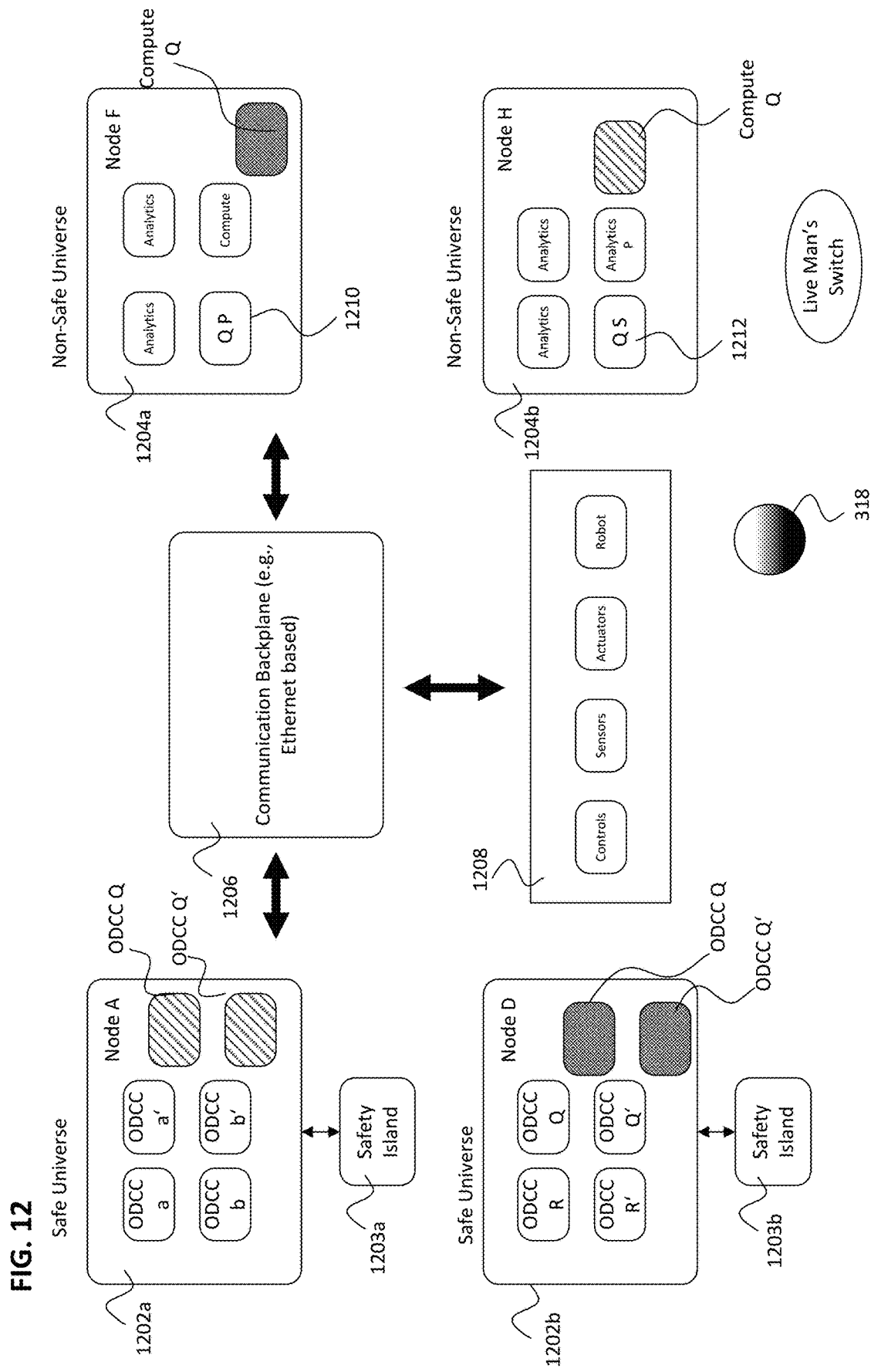
FIG. 12 depicts the use of microservice-based workloads for FS as a Service (FSaaS).

FIG. 12 depicts four processors 1202a-b and 1204a-b, wherein each processor is either part of a "safe universe" (e.g., 1202a-b) or a "non-safe universe" (e.g., 1204a-b). Each "safe universe" processor operates in conjunction to an SI (1203a and 1203b, respectively). Although depicted as separate chips for demonstrative purposes, the SIs may be implemented within partitions in the processor that it checks (e.g., 1203a operates within a partition of 1202a) or as a virtual processor of the processor that it checks. The SI may be configured to periodically check the health of its processor and/or to periodically verify the computations/workloads of its processor. For example, SI 1203a may periodically check the health of processor 1202a (e.g., verify that its temperature, clock speed, interconnect integrity, voltage, current, or any of these, are operating within a predetermined range/predetermined ranges). In so doing, the SI, which by definition has a FS certification, may also verify the operation of its corresponding processor, thereby rendering its corresponding processor an ROS. Thus, processors 1202a and 1202b, which are each verified by an SI, are within the safe universe. In contrast, processors 1204a and 1204b, which are not verified by an SI, are within the non-safe universe.

The safe universe processors 1202a and 1202b, may be configured to perform FS workflows, such as, e.g., ODCC checks. As depicted in FIG. 12, processor 1202a includes four cores (the number is only for demonstrative purposes and may be more or fewer in a given implementation), which perform ODCC checks. As is apparent from FIG. 12, the cores may redundantly process ODCC checks, such as a first core in 1202a performing ODCC X and a second core in 1202a performing ODCC X'.

For the task scheduler, all SR computational resources may be visualized as a "Collection of Safe Worlds" aka Safe Universe (SU) and all non-safe-realm partitions may be visualized as "Collection of Non-Safe Worlds', aka Non-Safe Universe (NSU). As an example, a SR workload can be redeployed/orchestrated in another compute available in the Safe Universe. With sensors and actuators connected over an network communication backplane, establishing connection with sensors and actuators may be performed seamlessly.

This can be more readily demonstrated in view of the following scenarios.

A regular operation scenario: As shown in FIG. 12, 1204a (non-safe universe) may be configured to perform a control algorithm. For example, 1204a may be configured to reading sensor values and is running the control algorithm on an available NSU node. An ODCC X FS workload matching the 1204a control algorithm may be run in an SU node. ODCC X (at 1202a) may sample sensor values periodically, creating a snapshot of the hash from sensor values on both the cores, and these may be sent to the SI (or to the second processing circuitry, depending on the implementation) for ODCC checks/comparisons. Any failure in the ODCC X check may result in the reset of the safe partition followed by a Live Man Switch to put the actuator into a safe state.

In above example, the ODCC mismatch implies that one of the components responsible for predictably/deterministically providing an ODCC snapshot failed. This could be in the compute (e.g., such as due to a clock drift or temperature change), could be due to software misbehavior; or could even be due to a network failure that failed to reliably deliver the sensor values to the compute and the ODCC workload. This is a fault that requires that the system/actuator be placed in a Safe state.

Aspects of the disclosure may be achieved via direct communication between virtual machines, such as direct communication between the safety related and non-safety-related machines depicted on FIG. 3 by the black arrow between 304 and 306a. That is, any of the virtual machines may be configured to communicate directly with one another.

In an existing/traditional FS setup, this would mean that the partition running the ODCC (and possibly even the system running that partition) may need to be rebooted followed by multiple self-tests to ensure the system is brought into a known good running state. This may take several minutes, depending on various factors, such as the BIOS boot time, the virtual machine emulator boot time, and the Operating System Boot time, and the time to establish communication with SI and then the control and ODCC application to restart once all the sanity checks have been completed on the sensors and actuators.

According to an aspect of the disclosure, while the partition that faulted is rebooting, the ODCC X (at 1202A) and Compute X (at 1204a) workloads can be orchestrated into an available worker node in the SU and NSU (for example, an available node in 1202b and 1204b, respectively, or in other safe universe and non-safe universe processors not pictured), and operation can continue, thereby reducing the system downtime significantly.

Consider an example of a cobot (a robot intended for direct human interaction) application, in which the user and the robot are co-operating within safe boundaries. Either due to a network fault or due to a fan failure, the ODCC snapshots were not sent to the SI (or the second processing circuitry, depending on the implementation) within the defined time boundary to SI. This may result in the ODCC snapshot check failing, thereby putting the cobot in safe state through Live-man switch. The partition/system running this ODCC workload for the cobot must then be rebooted. In the meantime, the cobot ODCC workload may be orchestrated into one or more available nodes, and sanity checks may be completed to proceed with the healthy state. The Cobot may then be released out of the safe state to continue operation.

This configuration may also enable lock-step execution with persistence. This is depicted in FIG. 12 relative to the Compute Q 1210 1202 and the ODCC Q (see 1202b). In this case, compute Q is depicted as having a primary workload 1210 (Q P) and a standby workload 1212 (Q S). The primary and standby workloads are orchestrated on different physical Nodes to ensure high availability and to eliminate common failure. The primary and standby workloads may run in loosely coupled lockstep execution, periodically exchanging their states and reading sensors and performing compute. Only the primary workloads drive the actuators. The standby workloads are in a hot standby state and are ready to take over when primary workload stops responding.

In a situation in which the primary workload experiences a failure, the Live Man switch is activated and puts the actuator in a Safe State. The standby workloads detect that the primary workloads are not responding in the next period and immediately take over the control and the ODCC execution. The standby workloads become the new primary. These new primary workloads (both ODCC and Compute workload) can perform quick sanity checks on the setup to ensure that the sensors and actuators are all in a healthy state. Once determined to be healthy, a new primary workload can continue operation. A new standby workload can now be setup on available SU and NSU worker nodes, and lock-step execution can be established again.

In this example, although the failure resulted in the actuator being placed in a safe state, the standby workloads are able to continue operation with a downtime of few seconds, which corresponds to the time needed to perform tests and establish that both sensors and actuators are in a healthy state and there is no risk of a hazard. Turning again to the example of the cobot application, once the secondary workload takes over, it may check from the sensors (position, torque, etc.) and establish that the user is at no risk. After this, it may reestablish communication with actuator and continue operation.

Using these strategies, the time required to continue operations may be reduced compared to system reboot followed by multiple self-tests to ensure that the system is brought into a known good running state.

New Sensor/Actuator: In this scenario, compute X is reading sensor values and is running the control algorithm on available NSU compute. The ODCC X workload for the same may be run in an SU compute, which may sample sensor values periodically, create a snapshot of the hash, send same to SI (or the second processing circuitry, depending on the implementation) for ODCC check/comparison.

If a new sensor is added to enhance the control algorithm, this needs to be considered in the ODCC. In a traditional setup, this would result in manual intervention to upload new software with control and ODCC algorithm on all nodes of SU and NSU, resulting in significant system downtime. In the proposed microservice-based approach, both software for control and the ODCC algorithm can be updated in a registry and made available to all nodes. This is may be shown in the form of the Compute R and the ODCC R in the NSU and the SU, respectively. With more sensors and actuators, the workloads can be deployed on a suitable node with enough compute power.

System Maintenance and updates: Updates to Software and Security are quite common in distributed, managed control systems. Containerization and task scheduling simplify the maintenance and updates with the registry mechanism and the ability to run applications and workloads independent of the host's operating system.

Conventional FS implementations make performing updates to the Operating System and applying Security patches inflexible, as these applications running native are tightly coupled to the Operating System and its environment. Benefits of container-based microservices architecture can be extended to FS as well.

STL execution is strongly dependent on hardware and firmware. Microcode and firmware updates to IPs in the SOC usually result in a modified system state. This requires updates to the STL algorithm as well. With the strategies and methods disclosed herein, STL workloads as microservices may enable a single coordinated system update, where software, firmware, and FS workloads may be bundled together and updated simultaneously.

In the following, various aspects of the present disclosure will be illustrated:

A data verifier may include a first processing circuitry, the first processing circuitry configured to perform a first safety operation a second processing circuitry. The first safety operation may include determining whether first sensor data representing a second processing circuitry factor satisfy a first verification criterion, and if the first verification criterion is satisfied, generate a second partition in the first processor, and generate a second processing circuitry to operate in the second partition or generate a signal representing an approval of the second processing circuitry for performing functional safety workflows. The features mentioned in this paragraph provide a data verifier of a first aspect.

The second processor factor may include a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof. The feature mentioned in this paragraph in combination with the first aspect provides a second aspect.

The determining whether the first sensor data satisfy the first verification criterion may include the first processing circuitry determining whether the second processing circuitry factor equals a predetermined value. The feature mentioned in this paragraph in combination with the second aspect provides a third aspect.

Furthermore, determining whether the first sensor data satisfy the first verification criterion may include the first processing circuitry determining whether the second processing circuitry factor is within a predetermined range. The feature mentioned in this paragraph in combination with the second aspect provides a fourth aspect.

The first processing circuitry or the second processing circuitry may be configured to, if the first verification criterion is satisfied, register the second processing circuitry with a task scheduler. The feature mentioned in this paragraph in combination with any one of the first aspect to fourth aspect provides a fifth aspect.

Moreover, a data verifier is provided. The data verifier may include a first processing circuitry and a second processing circuitry. The first processing circuitry may be configured to perform a first safety operation on the second processing circuitry. The first safety operation may include determining whether first sensor data representing a second processing circuitry factor satisfy a first verification criterion; and if first verification criterion is satisfied, execute a first safety measure; and if the first verification criterion is not satisfied, execute a second safety measure. The second processing circuitry may be configured to perform a second safety operation. The second safety operation may include determining whether a first value, generated by a third processing logic from sensor data and a second value, generated by a fourth processing logic from sensor data, satisfy a second verification criterion; and if the second verification criterion is satisfied, execute a third safety measure; and if the second verification criterion is not satisfied, execute a fourth safety measure. The features mentioned in this paragraph provide a data verifier of a sixth aspect.

The first processing circuitry and the second processing circuitry may be virtual processors and/or implemented in different partitions of a processor. The feature mentioned in this paragraph in combination with the first aspect provides a seventh aspect.

The third processing logic and the fourth processing logic may be implemented on a processor different from the first processing circuitry and the second processing circuitry. The feature mentioned in this paragraph in combination with the first aspect provides an eighth aspect.

The first processing circuitry may be configured to perform the first safety operation at a predetermined periodic frequency. The feature mentioned in this paragraph in combination with the first aspect provides a ninth aspect.

The first processing circuitry may be configured to receive a periodic signal and to conduct the verification processor check according to a frequency of the periodic signal. The feature mentioned in this paragraph in combination with the first aspect provides a tenth aspect.

The first value may include a unique identifier of the third processing logic, and the second value may include a unique identifier of the fourth processing logic, and wherein determining whether the second verification criterion is satisfied includes the second processing circuitry determining whether each of the unique identifier of the third processing logic and the unique identifier of the fourth processing logic corresponds to any of a plurality of trusted identifiers. The feature mentioned in this paragraph in combination with the first aspect provides an eleventh aspect.

The data verifier system may further including a memory that stores the plurality of trusted processor identifiers, and determining whether the second verification criterion is satisfied may include the second processing circuitry determining whether each of the unique identifier of the third processing logic and the unique identifier of the fourth processing logic matches a trusted processor identifier in the memory. The feature mentioned in this paragraph in combination with the first aspect provides a twelfth aspect.

The second processing circuitry may determine whether the unique identifier of the third processing logic and the unique identifier of the fourth processing logic are identical, and if the unique identifier of the third processing logic and the unique identifier of the fourth processing logic are identical, may reassign a safety data workload or send a signal representing an instruction to reassign a safety data workload. The feature mentioned in this paragraph in combination with the first aspect provides a thirteenth aspect.

The first value may include an output of a hash function as applied to sensor data sampled by the third processing logic the second value includes an output of the hash function as applied to sensor data sampled by the fourth processing logic. The feature mentioned in this paragraph in combination with the first aspect provides a fourteenth aspect.

The first value may include an output of a cyclic redundancy check as applied to sensor data sampled by the third processing logic and the second value may include an output of the cyclic redundancy check as applied to sensor data sampled by the fourth processing logic. The feature mentioned in this paragraph in combination with the first aspect provides a fifteenth aspect.

The first value may include a first temporal indicator and the second value may include a second temporal indicator; and determining whether the second verification criterion is satisfied may include the second processing circuitry determining whether the first temporal indicator and the second temporal indicator are within a predetermined temporal range. The feature mentioned in this paragraph in combination with the first aspect provides a sixteenth aspect.

The first temporal indicator may indicate a time of the first value, and the second temporal indicator may indicate a time of the second value. The feature mentioned in this paragraph in combination with the first aspect may provide a seventeenth aspect.

The time of the first value may represents a time that the third processing logic sampled sensor data corresponding to the first value, and the time of the second value may represent a time that the fourth processing logic sampled sensor data corresponding to the second value. The feature mentioned in this paragraph in combination with the first aspect provides an eighteenth aspect.

The time of the first value may be a time that the third processing logic generated the first value, and the time of the second value may be a time that the fourth processing logic generated the second value. The feature mentioned in this paragraph in combination with the first aspect provides a nineteenth aspect.

Executing the third safety measure may include the second processing circuitry generating an instruction to delete the third processing logic and/or the fourth processing logic. The feature mentioned in this paragraph in combination with the first aspect provides a twentieth aspect.

Executing the fourth safety measure may include the second processing circuitry generating no instruction to delete the third processing logic and/or the fourth processing logic. The feature mentioned in this paragraph in combination with the first aspect provides a twenty first aspect.

Executing the fourth safety measure may include the second processing circuitry generating an instruction to delete the third processing logic and/or the fourth processing logic. The feature mentioned in this paragraph in combination with the first aspect provides a twenty second aspect.

Executing the fourth safety measure may include the second processing circuitry not generating an instruction to delete the third processing logic and/or the fourth processing logic. The feature mentioned in this paragraph in combination with the first aspect provides a twenty third aspect.

Executing the third safety measure may include generating an instruction to take a processor offline, an instruction to take a sensor offline, an instruction to reboot an operating system, an instruction to perform a test on a sensor, an instruction to perform a test on a processor, or any of these. The feature mentioned in this paragraph in combination with the first aspect provides a twenty fourth aspect.

Executing the fourth safety measure may include generating an instruction to take a processor offline, an instruction to take a sensor offline, an instruction to reboot an operating system, an instruction to perform a test on a sensor, an instruction to perform a test on a processor, or any of these. The feature mentioned in this paragraph in combination with the first aspect provides a twenty fifth aspect.

The data verifier may include a modem configured to receive a first signal representing the first value and a second signal representing the second value, and the second processing circuitry may be configured to receive data representing the first signal and the second signal from the modem. The modem may be configured to receive the first signal and the second signal via a network communication protocol. The feature mentioned in this paragraph in combination with the first aspect provides a twenty sixth aspect.

The second processing circuitry factor may include a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof. The feature mentioned in this paragraph in combination with the first aspect provides a twenty seventh aspect.

Determining whether the first sensor data satisfy the first verification criterion may include the first processing circuitry determining whether the second processing circuitry factor equals a predetermined value or is within a predetermined range. The feature mentioned in this paragraph in combination with the first aspect provides a twenty eighth aspect.

Performing the first safety operation may include, if the second processing circuitry factor is not within the predetermined range, the first processing circuitry generating a message to interrupt the second processing circuitry. The feature mentioned in this paragraph in combination with the first aspect provides a twenty ninth aspect.

If the first sensor data satisfy the first verification criterion, the first processing circuitry may be configured to certify the second processing circuitry as a root of safety. The feature mentioned in this paragraph in combination with the first aspect provides a thirtieth aspect.

The first processing circuitry may be configured as an SI, and the second processing circuitry may be configured as an ROS. The feature mentioned in this paragraph in combination with the first aspect provides a thirty first aspect.

The second processing circuitry may be further configured to generate a first message, that includes a unique identifier of the third processing logic, and a first instruction for the third processing logic to sample sensor data from a sensor; generate from the sensor data the first value; and generate a feedback message representing at least the unique identifier of the third processing logic and the first value. The second processing circuitry may be configured to generate a second message including: a unique identifier of the fourth processing logic, and a second instruction for the fourth processing logic to: sample sensor data from the sensor; generate from the sensor data the second value; and generate a feedback message representing at least the unique identifier of the fourth processing logic and the second value. The feature mentioned in this paragraph in combination with the first aspect provides a thirty second aspect.

Each of the first value and the second value may be an output of a hash function as applied to the sensor data; and the first instruction may include an instruction for the third processing logic to perform the hash function on the sensor data; and the second instruction may include an instruction for the fourth processing logic to perform the hash function on the sensor data. The feature mentioned in this paragraph in combination with the first aspect provides a thirty third aspect.

Each of the first value and the second value may be an output of a cyclic redundancy check as applied to the sensor data and the first instruction may further include an instruction for the third processing logic to perform the cyclic redundancy check on the sensor data; and the second instruction may further include an instruction for the fourth processing logic to perform the cyclic redundancy check on the sensor data. The feature mentioned in this paragraph in combination with the first aspect provides a thirty fourth aspect.

The data verifier may include a memory configured to store a STL including a plurality of FS operations. The first instruction may include an FS operation of the plurality of FS operations, and generating the first instruction may include the second processing circuitry reading out the FS operation from the memory. The feature mentioned in this paragraph in combination with the first aspect provides a thirty fifth aspect.

An additional or alternative first aspect may be a method of verifying data that may include performing in a first processing circuitry a first safety operation on a second processing circuitry, the first safety operation including determining whether first sensor data representing a second processing circuitry factor satisfy a first verification criterion; and if the first verification criterion is satisfied, generating a second partition, and generate a second processing circuitry to operate in the second partition, or generate a signal representing an approval of the second processing circuitry to perform safety critical operations or safety operations. This first aspect may be coupled with any of the subsequent aspects described above.

A non-transitory computer readable medium may include instructions which, if implemented, cause one or more processors to perform the above method of the first aspect.

A data verifier may include a first processing circuitry configured to perform a safety operation, the safety operation including: determining whether sensor data representing a second processing circuitry factor satisfy a verification criterion; and if the verification criterion is satisfied, generate a signal representing an approval for the second processing circuitry to perform safety critical tasks. The feature mentioned in this paragraph in provides a thirty sixth aspect.

The second processing circuitry factor may include a temperature of the second processing circuitry, a processing speed of the second processing circuitry, a processing latency of the second processing circuitry, an interconnect integrity of an interconnect of the second processing circuitry, a voltage of a portion of the second processing circuitry compared to a reference voltage, a current drawn into or exiting from the second processing circuitry, or any combination thereof. The feature mentioned in this paragraph in combination with the thirty sixth aspect provides a thirty seventh aspect.

Determining whether the sensor data satisfy the verification criterion may include the first processing circuitry determining whether the second processing circuitry factor equals a predetermined value or is within a predetermined range. The feature mentioned in this paragraph in combination with the thirty sixth aspect provides a thirty eighth aspect.

If the verification criterion is satisfied, the first processing circuitry or the second processing circuitry may be configured to register the second processing circuitry with a task scheduler. The feature mentioned in this paragraph in combination with the thirty sixth aspect provides a thirty ninth aspect.

A first processing circuitry may be configured to perform a first safety operation, the first safety operation including: determining whether first sensor data representing a second processing circuitry factor satisfy a first verification criterion; and if first verification criterion is satisfied, execute a first safety measure; and if the first verification criterion is not satisfied, execute a second safety measure; a second processing circuitry, configured to perform a second safety operation, the second safety operation including: determining whether a first value, generated by a third processing logic from sensor data satisfy a second verification criterion; and if the second verification criterion is satisfied, execute a third safety measure; and if the second verification criterion is not satisfied, execute a fourth safety measure. The feature provides a fortieth aspect.

The second safety operation may include determining whether the first value, generated by the third processing logic from sensor data, and a second value, generated by a fourth processing logic from sensor data, satisfy the second verification criterion. The feature mentioned in this paragraph in combination with the fortieth aspect provides a forty first aspect.

The first value may include a unique identifier of the third processing logic, and the second value may include a unique identifier of the fourth processing logic. Determining whether the second verification criterion is satisfied may include the second processing circuitry determining whether each of the unique identifier of the third processing logic and the unique identifier of the fourth processing logic corresponds to any of a plurality of trusted identifiers. The feature mentioned in this paragraph in combination with the fortieth aspect provides a forty second aspect.

The second processing circuitry may determine whether the unique identifier of the third processing logic and the unique identifier of the fourth processing logic are identical, and if the unique identifier of the third processing logic and the unique identifier of the fourth processing logic are identical, may reassign a safety data workload or to send a signal representing an instruction to reassign a safety data workload. The feature mentioned in this paragraph in combination with the fortieth aspect provides a forty third aspect.

The first value may include an output of a hash function or a cyclic redundancy check as applied to sensor data sampled by the third processing logic, and the second value may include an output of the hash function or a cyclic redundancy check as applied to sensor data sampled by the fourth processing logic. The feature mentioned in this paragraph in combination with the fortieth aspect provides a forty fourth aspect.

The first value may include a first temporal indicator and the second value may include a second temporal indicator. Determining whether the second verification criterion is satisfied may include the second processing circuitry determining whether the first temporal indicator and the second temporal indicator are within a predetermined temporal range. The feature mentioned in this paragraph in combination with the fortieth aspect provides a forty fifth aspect.

The first temporal indicator may include a time of the first value, and the second temporal indicator may indicate a time of the second value. The feature mentioned in this paragraph in combination with the fortieth aspect provides a forty sixth aspect.

Executing the third safety measure may include the second processing circuitry generating an instruction to reboot the third processing logic and/or the fourth processing logic. Executing the fourth safety measure may include the second processing circuitry generating no instruction to reboot the third processing logic and/or the fourth processing logic. The feature mentioned in this paragraph in combination with the fortieth aspect provides a forty seventh aspect.

Executing the fourth safety measure may include the second processing circuitry generating an instruction to reboot the third processing logic and/or the fourth processing logic. Executing the fourth safety measure may include the second processing circuitry not generating an instruction to reboot the third processing logic and/or the fourth processing logic. The feature mentioned in this paragraph in combination with the fortieth aspect provides a forty eighth aspect.

Executing the third safety measure or the fourth safety measure may include generating an instruction to take a processor offline, an instruction to take a sensor offline, an instruction to reboot an operating system, an instruction to perform a test on a sensor, an instruction to perform a test on a processor, or any of these. The feature mentioned in this paragraph in combination with the fortieth aspect provides a forty ninth aspect.

The second processing circuitry factor may include a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof. The feature mentioned in this paragraph in combination with the fortieth aspect provides a fiftieth aspect.

The first processing circuitry may be a safety island. The second processing circuitry may be a root of safety. The feature mentioned in this paragraph in combination with the fortieth aspect provides a fifty first aspect.

A non-transitory computer readable medium may include instructions which, if executed, cause one or more processors to perform any of the fortieth to the fifty first aspects.

The first processing circuitry as described in any of the above aspects may natively operate at a first safety processing level, and the second processing circuitry as disclosed in any of the above aspects may natively operate as at second safety processing level. The first safety processing level is a safety processing level associated with greater safety than the second safety processing level.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like. Any processor, as used herein, may be implemented virtually, such as on a virtual machine. In this manner, two or more processors may be implemented in the same hardware (e.g., the same processing unit, the same compute).

Various aspects of this disclosure describe a "safety operation" (e.g., a "first safety operation" a "second safety operation", etc.). A safety operation, as it is used herein, may be any operation performed by a processing logic for purposes of safety/functional safety that is performed on the basis of data from at least one other sensor or processor/processing logic. That is, a second processing circuitry is often described herein as performing a safety operation using data from a third processing logic, and in some instances, also from a fourth processing logic, different from the third processing logic.

One option for a safety operation as described herein is referred to as a cross-comparison workload (CCW). In a CCW, a processing logic (continuing with the above example, the second processing circuitry) receives a first value from a third processing logic (or processing node, processing partition) and a second value from a fourth processing logic (or processing node, processing partition) and compares the first value and the second value to determine whether they satisfy a predetermined criterion (e.g., they are identical or they are within a predetermined range or tolerance of one another). The first value and the second value are generally derived from sensor data and may include a "snapshot" of the sensor data, such as a hash generated from the second data or a Cyclic Redundancy Code (CRC). This snapshot may also include a unique ID of the processor generating the snapshot, a timestamp of the snapshot generation, a matching identifier for a checker, a love man switch, or any of these.

The term "On-Demand Cross Comparison" (ODCC) is used herein as an example of a CCW. Although the principles and methods disclosed herein may be performed with ODCC workloads, these principles and methods may generally be applied to any CCW. Both ODCCs and CCWs are "safety operations" as described here. Moreover, the terms CCW and ODCC are used occasionally herein for simplicity to simply refer to a safety operation, even a safety operation for which cross-comparison is not necessary. Both the terms ODCC and CCW are intended to apply at least to checking sensor values (whether single or in combination), range checks, control algorithm computation, value checks, or otherwise, or any of these.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

A robot as used herein is intended to describe an autonomous mobile robot (AMR) or a multi-axis robot arm. An AMR may include any robot that can understand and move through its environment without direct input from a supervising entity and without operating on a predefined track (e.g. such as with an Automated Guided Vehicle, which may operate exclusively on a pre-defined track). AMRs may be implemented in nearly any environment and are frequently used in warehouses, distribution centers, and manufacturing facilities. Such robots may perform any of a variety of safety critical tasks or operations within a functional safety context. A fixed multi-axis robot arm may include any robotic device with a plurality of joints, which can be directed to in multiple degrees of freedom or may be angled from a fixed point such that at least one appendage moves along at least two axis relative to the fixed point. In some implementations, the fixed multi-axis robot may, but need not, resemble a human arm.

It is expressly stated that the principles, methods, and devices of this disclosure are intended to apply to autonomous vehicles, robots, and ICSs. Where any one of these terms (autonomous vehicles, robots, or ICSs) is used, it is done for convenience purposes only, and the safety provisions disclosed apply mutatis mutandis to the others of these terms.

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A data verifier system, comprising:
   a first processing circuitry configured to perform a safety operation, the safety operation comprising:
      determining from sensor data representing a second processing circuitry factor whether a verification criterion is satisfied; and
      if the verification criterion is satisfied, generate a signal representing an approval for the second processing circuitry to perform a safety critical task;
      wherein the second processing circuitry factor comprises
      a temperature of the second processing circuitry,
      a processing speed of the second processing circuitry,
      an interconnect integrity of an interconnect of the second processing circuitry,
      a voltage of a portion of the second processing circuitry compared to a reference voltage, or a current drawn into or exiting from the second processing circuitry;
      wherein if the verification criterion is satisfied, the first processing circuitry or the second processing circuitry is configured to register the second processing circuitry with a task scheduler to perform the safety critical task, and wherein if the verification criterion is not satisfied, the first processing circuitry and the second processing circuitry are configured to not register the second processing circuitry with the task scheduler to perform the safety critical task.

2. The data verifier of claim 1, wherein determining whether the sensor data satisfy the verification criterion comprises the first processing circuitry determining whether the second processing circuitry factor equals a predetermined value or is within a predetermined range.

3. A data verifier system, comprising:
   a first processing circuitry, configured to perform a first safety operation, the first safety operation comprising:
      determining whether first sensor data representing a second processing circuitry factor satisfy a first verification criterion; and
      if first verification criterion is satisfied, execute a first safety measure; and if the first verification criterion is not satisfied, execute a second safety measure;
a second processing circuitry, configured to perform a second safety operation, the second safety operation comprising:
  determining whether a first value, generated by a third processing logic from second sensor data, and a second value, generated by a fourth processing logic from the second sensor data, satisfy a second verification criterion; and
  if the second verification criterion is satisfied, execute a third safety measure; and
  if the second verification criterion is not satisfied, execute a fourth safety measure;
wherein the second processing circuitry is further configured to determine whether a unique identifier of the third processing logic and a unique identifier of the fourth processing logic are identical, and if the unique identifier of the third processing logic and the unique identifier of the fourth processing logic are identical, to reassign a safety data workload or to send a signal representing an instruction to reassign a safety data workload.

4. The data verifier of any of claim 3, wherein the first value comprises a unique identifier of the third processing logic, and the second value comprises a unique identifier of the fourth processing logic, and wherein determining whether the second verification criterion is satisfied comprises the second processing circuitry determining whether each of the unique identifier of the third processing logic and the unique identifier of the fourth processing logic corresponds to any of a plurality of trusted identifiers.

5. The data verifier of claim 3, wherein the first value comprises an output of a hash function as applied to the second sensor data sampled by the third processing logic the second value comprises an output of the hash function as applied to the second sensor data sampled by the fourth processing logic.

6. The data verifier of claim 3, wherein the first value comprises an output of a cyclic redundancy check as applied to the second sensor data sampled by the third processing logic and the second value comprises an output of the cyclic redundancy check as applied to the second sensor data sampled by the fourth processing logic.

7. The data verifier of claim 3, wherein the first value comprises a first temporal indicator and the second value comprises a second temporal indicator; and wherein determining whether the second verification criterion is satisfied comprises the second processing circuitry determining whether the first temporal indicator and the second temporal indicator are within a predetermined temporal range.

8. The data verifier of claim 7, wherein the first temporal indicator indicates a time of the first value, and wherein the second temporal indicator indicates a time of the second value.

9. The data verifier of claim 3, wherein executing the third safety measure comprises the second processing circuitry generating an instruction to reboot the third processing logic or the fourth processing logic, and wherein executing the fourth safety measure comprises the second processing circuitry generating no instruction to reboot the third processing logic and/or the fourth processing logic.

10. The data verifier of claim 3, wherein executing the third safety measure comprises the second processing circuitry generating an instruction to reboot the third processing logic and/or the fourth processing logic, and wherein executing the fourth safety measure comprises the second processing circuitry generating no instruction to reboot the third processing logic and/or the fourth processing logic.

11. The data verifier of claim 3, wherein executing the third safety measure or the fourth safety measure comprises generating an instruction to take a processor offline, an instruction to take a sensor offline, an instruction to reboot an operating system, an instruction to perform a test on a sensor, an instruction to perform a test on a processor, or any of these.

12. The data verifier of claim 3, wherein the second processing circuitry factor comprises a temperature of the second processing circuitry, a processing speed of the second processing circuitry, an interconnect integrity of an interconnect of the second processing circuitry, a voltage of a portion of the second processing circuitry compared to a reference voltage, a current drawn into or exiting from the second processing circuitry, or any combination thereof.

13. The data verifier of claim 3, wherein the first processing circuitry is a safety island, and wherein the second processing circuitry is a root of safety.

14. A non-transitory computer readable medium, comprising instructions which, if executed, cause one or more processors to:
  perform, in a first processing circuitry, a safety operation, the safety operation comprising:
    determining from sensor data representing a second processing circuitry factor whether a verification criterion is satisfied; and
  if the verification criterion is satisfied, generate a signal representing an approval for the second processing circuitry to perform safety critical tasks;
  wherein the second processing circuitry factor comprises
    a temperature of the second processing circuitry,
    a processing speed of the second processing circuitry,
    an interconnect integrity of an interconnect of the second processing circuitry,
    a voltage of a portion of the second processing circuitry compared to a reference voltage, or a current drawn into or exiting from the second processing circuitry;
  wherein if the verification criterion is satisfied, the first processing circuitry or the second processing circuitry is configured to register the second processing circuitry with a task scheduler to perform the safety critical task, and wherein if the verification criterion is not satisfied, the first processing circuitry and the second processing circuitry are configured to not register the second processing circuitry with the task scheduler to perform the safety critical task.

15. A functional safety system, comprising:
a first processing circuitry, configured to execute a first safety operation, comprising:
  calculating a first value from first sensor data; and
  sending a signal representing the first value;
wherein the first processing circuitry is configured to execute the first safety operation according to a periodic schedule comprising a plurality of first value sending opportunities; and
a second processing circuitry, configured to:
  determine for each of the first value sending opportunities, whether the first processing circuitry sent the signal representing the first value; and
  if no signal representing the first value is sent at a first value sending opportunity, perform a second safety operation;
  wherein the second safety operation comprises determining whether the first value, generated by a third processing logic from second sensor data, and a second value, generated by a fourth processing logic from the second sensor data, satisfy second verification criterion;

wherein the second processing circuitry is further configured to determine whether the unique identifier of the third processing logic and the unique identifier of the fourth processing logic are identical, and if the unique identifier of the third processing logic and the unique identifier of the fourth processing logic are identical, to reassign a safety data workload or to send a signal representing an instruction to reassign a safety data workload.

16. The functional safety system of claim 15, wherein the first processing circuitry is a safety-realm, and the second processing circuitry is a processing logic in a non-safety-realm.

17. The functional safety system of claim 15, further comprising a third processing logic, wherein, in response to the second processing circuitry performing the first safety operation, the third processor logic is configured to:

determine for each of the first value sending opportunities, whether the second processing circuitry sent the signal representing the first value; and if no signal representing the first value is sent at a first value sending opportunity, performing the first safety operation.

* * * * *